(12) United States Patent
Janicki

(10) Patent No.: US 9,708,937 B2
(45) Date of Patent: Jul. 18, 2017

(54) MULTI-FUNCTIONAL FECAL WASTE AND GARBAGE PROCESSOR AND ASSOCIATED METHODS

(71) Applicant: Bill & Melinda Gates Foundation, Seattle, WA (US)

(72) Inventor: Peter Janicki, Mount Vernon, WA (US)

(73) Assignee: Bill & Melinda Gates Foundation, Seattle, WA (US)

( * ) Notice: Subject to any disclaimer, the term of this patent is extended or adjusted under 35 U.S.C. 154(b) by 325 days.

(21) Appl. No.: 14/542,521

(22) Filed: Nov. 14, 2014

(65) Prior Publication Data
US 2016/0138433 A1    May 19, 2016

(51) Int. Cl.
| | |
|---|---|
| F01K 25/04 | (2006.01) |
| F22B 31/00 | (2006.01) |
| B01D 1/04 | (2006.01) |
| C02F 1/00 | (2006.01) |
| F01K 17/04 | (2006.01) |
| C02F 9/00 | (2006.01) |
| B01D 1/22 | (2006.01) |
| F01K 17/06 | (2006.01) |
| C02F 1/04 | (2006.01) |
| C02F 11/12 | (2006.01) |
| C02F 1/20 | (2006.01) |
| C02F 1/28 | (2006.01) |

(Continued)

(52) U.S. Cl.
CPC .............. *F01K 25/04* (2013.01); *B01D 1/04* (2013.01); *B01D 1/226* (2013.01); *C02F 1/004* (2013.01); *C02F 9/00* (2013.01); *F01K 17/04* (2013.01); *F01K 17/06* (2013.01); *F22B 31/0007* (2013.01); *C02F 1/001* (2013.01); *C02F 1/04* (2013.01); *C02F 1/20* (2013.01); *C02F 1/283* (2013.01); *C02F 1/444* (2013.01); *C02F 11/06* (2013.01); *C02F 11/12* (2013.01); *C02F 2303/06* (2013.01); *C02F 2303/10* (2013.01); *Y02W 10/30* (2015.05)

(58) Field of Classification Search
CPC .......... F01K 25/04; F01K 17/06; F01K 17/04; F22B 31/0007; B01D 1/04; B01D 1/226; C02F 9/00; C02F 1/004; C02F 1/001; C02F 1/20; C02F 1/283; C02F 1/444; C02F 11/06; C02F 2303/10; C02F 2303/06; C02F 11/12; C02F 1/04; Y02W 10/30
USPC .................... 60/670; 34/72, 73, 86, 210, 407
See application file for complete search history.

(56) References Cited

U.S. PATENT DOCUMENTS

| | | | | |
|---|---|---|---|---|
| 4,254,716 A | * | 3/1981 | Graham | .................... F23G 5/02 110/187 |
| 4,290,269 A | | 9/1981 | Hedstrom | |

(Continued)

FOREIGN PATENT DOCUMENTS

EP    2537815 A1    12/2006

OTHER PUBLICATIONS

International Search Report & Written Opinion, PCT/US2015/59765; Mailing Date: Mar. 4, 2016; 15 Pages.

Primary Examiner — Hoang Nguyen
(74) Attorney, Agent, or Firm — Perkins Coie LLP

(57) ABSTRACT

At least one aspect of the technology provides a self-contained processing facility configured to convert organic, high water-content waste, such as fecal sludge and garbage, into electricity while also generating and collecting potable water.

28 Claims, 26 Drawing Sheets

(51) Int. Cl.
*C02F 1/44* (2006.01)
*C02F 11/06* (2006.01)

(56) References Cited

U.S. PATENT DOCUMENTS

| | | | | |
|---|---|---|---|---|
| 4,414,813 A | * | 11/1983 | Knapp | F01K 23/06 |
| | | | | 60/39.182 |
| 4,742,623 A | | 5/1988 | Meurer | |
| 4,849,100 A | | 7/1989 | Papandrea | |
| 5,079,852 A | | 1/1992 | Nakayama | |
| 5,357,881 A | * | 10/1994 | Elcik | F23G 5/04 |
| | | | | 110/186 |
| 5,419,267 A | * | 5/1995 | Raiko | F23C 10/10 |
| | | | | 110/245 |
| 6,796,250 B1 | | 9/2004 | Greene | |
| 8,832,962 B2 | | 9/2014 | Pardo | |
| 2008/0216346 A1 | | 9/2008 | Fernando | |
| 2015/0121870 A1 | * | 5/2015 | Delson | F23G 5/04 |
| | | | | 60/645 |

\* cited by examiner

MULTI-FUNCTIONAL FECAL WASTE AND GARBAGE PROCESSOR AND ASSOCIATED METHODS

TECHNICAL FIELD

The present technology is directed to multi-functional fecal waste and garbage processing systems, equipment, and associated methods.

BACKGROUND

Many areas of the world utilize open sanitation systems for handling human waste and other garbage, while other areas utilize unsatisfactory septic systems or other systems that discharge raw sewage into open drains or surface waters. Such poor sanitation conditions contribute to significant health problems in these areas. Many of these areas with inadequate sanitation systems also struggle with maintaining clean drinking water, which further adds to potential health issues. These areas often have limited resources available for generating electricity, or the cost for generating electricity is prohibitively expensive. Accordingly, there is a need for adequate sanitation systems that keep waste out of the environment, for providing and maintaining access to clean potable water, and for generating inexpensive electricity.

SUMMARY

The present technology provides multi-functional systems for processing waste while generating electricity and potable water in a manner that overcomes drawbacks experienced in the prior art and provides additional benefits. At least one aspect of the technology provides a self-contained processing facility configured to convert organic, high water-content waste, such as fecal sludge and garbage, into electricity while also generating and collecting potable water.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical or at least generally similar or analogous components or features.

Appendix A includes additional information and calculations regarding aspects of the current technology.

DETAILED DESCRIPTION

The present disclosure describes multi-functional waste processing systems configured for generating electricity and potable water in accordance with certain embodiments of the present technology. Several specific details of the technology are set forth in the following description and in FIGS. 1-33 to provide a thorough understanding of certain embodiments of the present technology. One skilled in the art, however, will understand that the present technology may have additional embodiments and that other embodiments of the technology may be practiced without several of the specific features described below.

Figure 1:
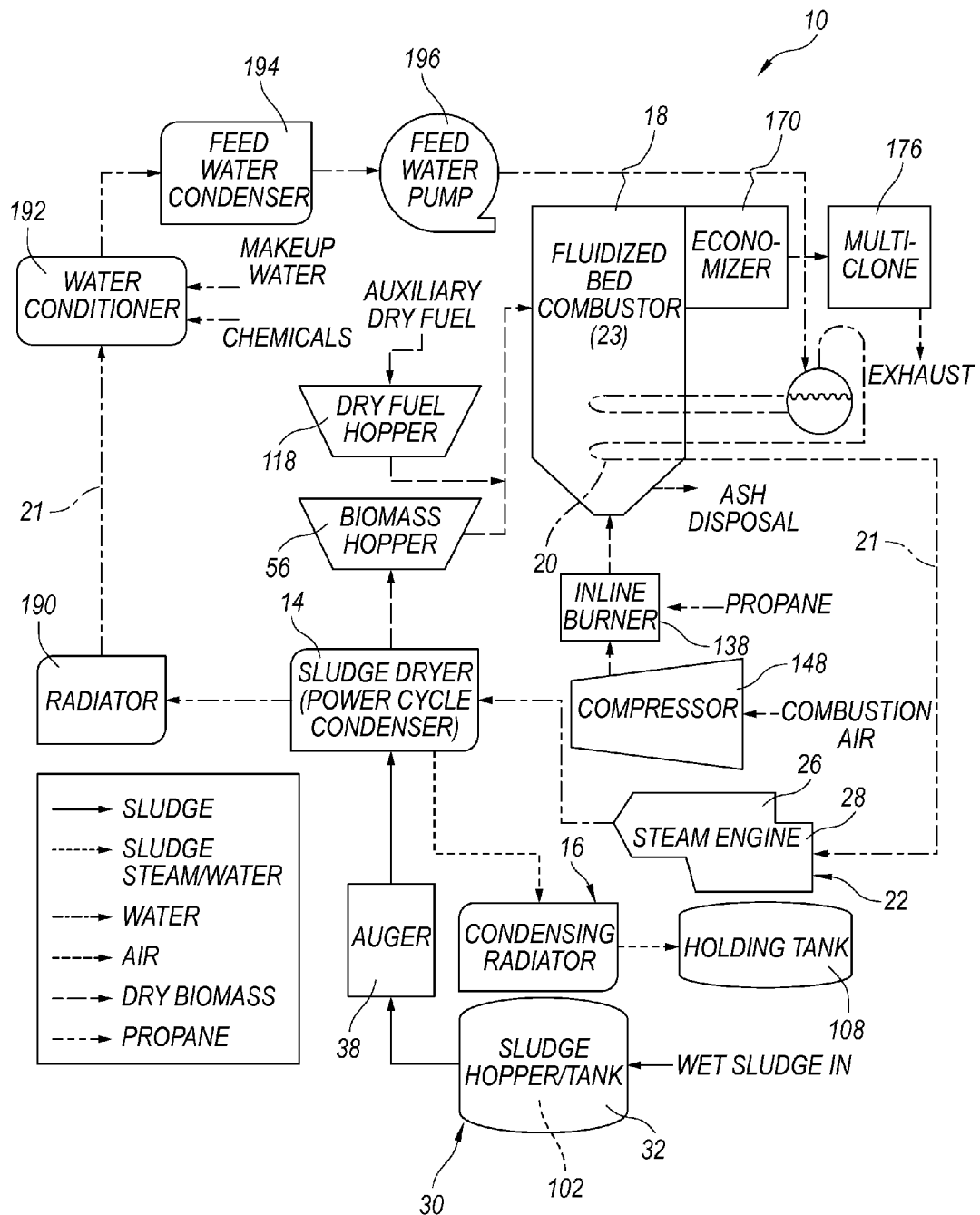
FIG. 1 is a schematic flow-chart illustration of components of a multi-functional waste processing system in accordance with an embodiment of the present technology.
Figure 2:
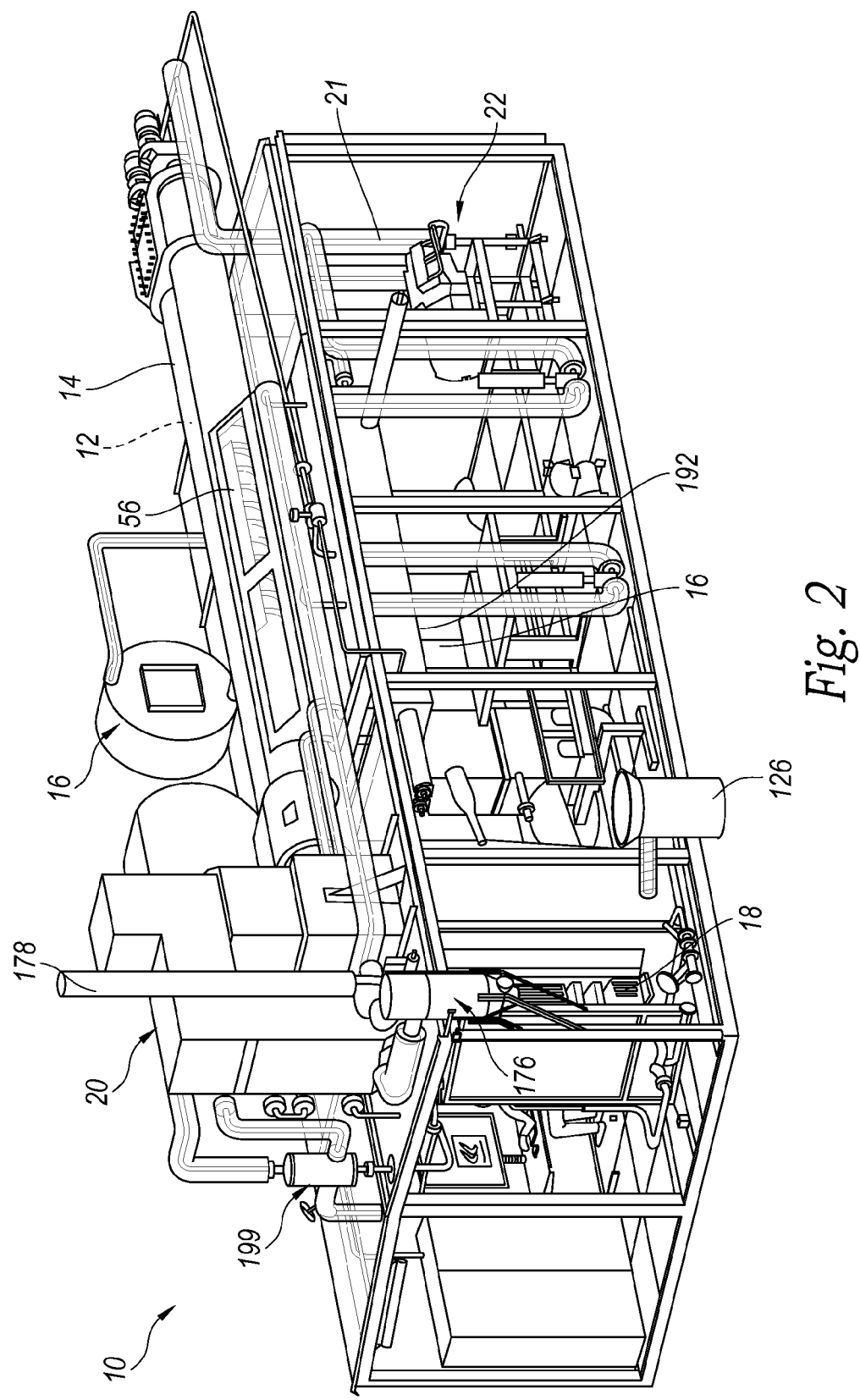
FIG. 2 is an isometric view of the multi-functional waste processing system of FIG. 1.

FIG. 1 is a schematic flow-chart illustration of components a multi-functional waste processing system 10, and FIG. 2 is an isometric view of the waste processing system 10 in accordance with an embodiment of the present technology. As discussed in greater detail below, the system 10 is configured to receive and process a flow of wet waste sludge 12, and to generate dry, solid fuel material, electricity, and potable water. One or more embodiments of the system 10 are discussed and illustrated herein in connection with processing waste comprising wet sludge containing water and fecal matter and/or other garbage, such as organic waste. The system 10, however, can be configured for processing a flow of other wet waste. In one embodiment, the system is configured to process wet sludge containing a mixture of water-based liquids and up to approximately 50% total solids that can be separated from the water and dried to provide combustible solid fuel material. In some configurations, the system 10 can be used with wet sludge having up to approximately 15% total solids, and in other embodiments the system 10 is configured for use with sludge having approximately 20%-50% total solids. The system 10 of other embodiments can be configured for use with other ranges of total solids within the sludge.

The sludge 12 flows through a sludge dryer assembly 14 that evaporates water from the sludge to generate steam, such that the solid materials are sufficiently dried to provide combustible solid fuel material. For purposes of this description, the steam evaporated from the sludge is referred to as sludge vapor. The liberated sludge vapor is very hot for a sufficient duration, so that the sludge vapor is sterile (i.e., free of pathogens). The system 10 contains and condenses the sterile sludge vapor in a water treatment system 16 to provide clean potable water. The system 10 also burns the dried solid fuel material, in a combustor, such as a fluidized bed combustor 18. In some embodiments, other dried fuels, such as coal, wood pellets, garbage or other organic material can be added if necessary to provide additional fuel to the combustor 18. The system 10 of the illustrated embodiment is configured to continually produce up to approximately 150 kW (approximately 200 hp) of electricity and to process approximately 8500 kg or 8.5 m³ of fecal sludge and 1100 kg of garbage or more per day.

Heat from the fuel combustion in the combustor 18 is used to heat a boiler 20, which pressurizes water in a substantially closed primary water circuit 21 to generate steam for use by a steam-driven power plant 22 that produces electricity. The water in the primary water circuit 21 is referred to as primary water, which may be primary steam or primary liquid water, depending upon the location within the primary water circuit. Primary steam exhausted from the power plant 22 which includes a steam engine 26 and a generator 25 is used as a heat source by the fuel dryer assembly 14 before the primary steam flows through a condenser 24 and is converted back to primary liquid water and pumped back to the boiler 20. A portion of the electricity from the power plant 22 powers electrical components of the system 10, and the remaining electricity can be provided to a power grid or otherwise used locally, such as to power external electrical items.

The processing system 10 of the illustrated embodiment is a self-contained system that requires substantially no outside electricity, water or drainage to process the wet sludge and generate electricity and potable water. In one embodiment, the illustrated system 10 can be configured to occupy a volume with a footprint of approximately 15 m×3 m, which corresponds to a typical shipping container, such that the system 10 may be transportable. Accordingly, the system 10 is well suited for use in a wide range of geographic locations, such as under developed urban locations that may have inadequate sewage systems, and that could benefit from additional sources of electricity and clean, fresh potable water. The components of the system 10 of the illustrated embodiment are discussed in greater detail below.

Sludge Holding and Delivery System

Figure 3:
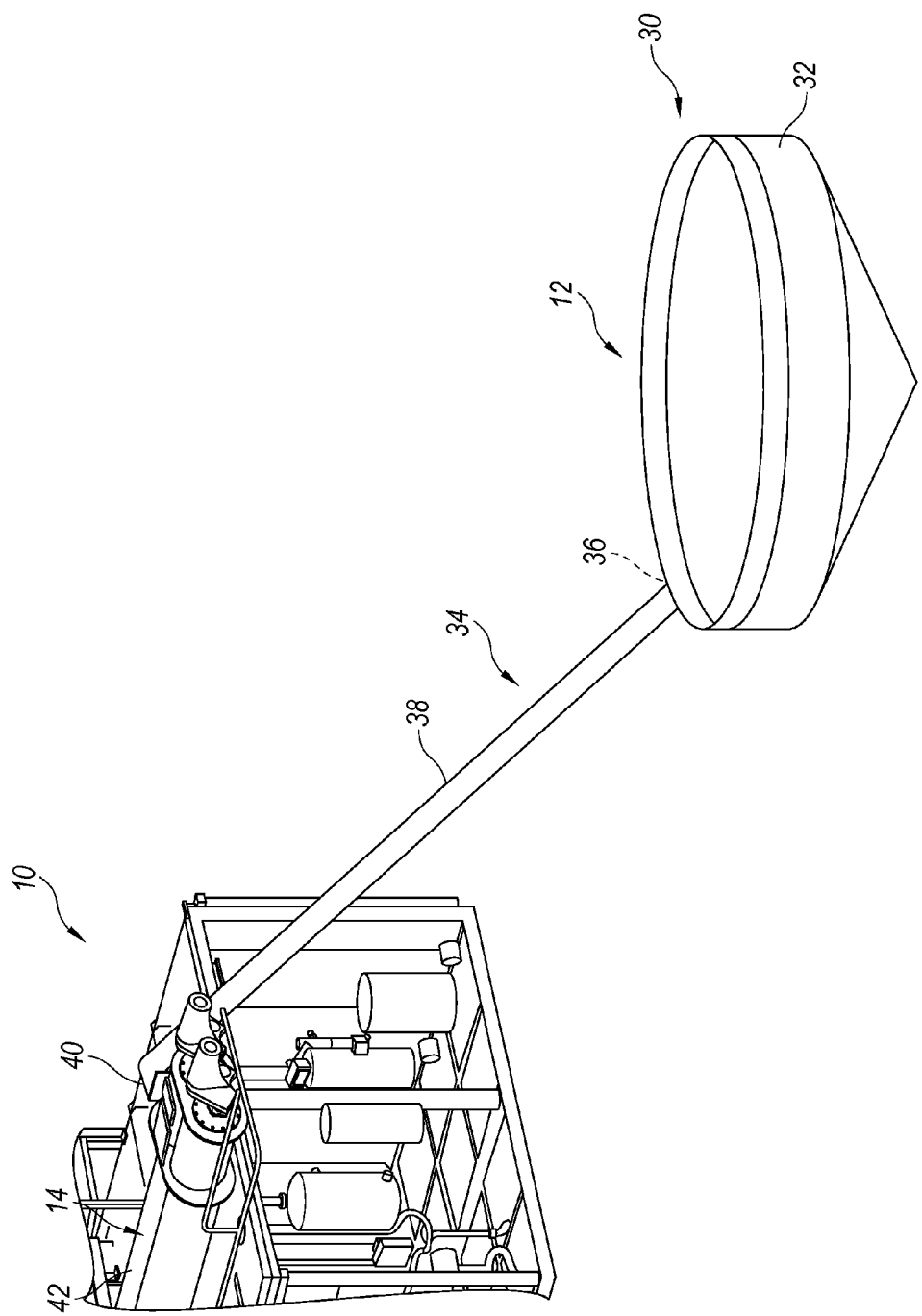
FIG. 3 is an isometric view of a sludge holding and delivery system in accordance with an aspect of the technology.

The system 10 of the illustrated embodiment shown in FIG. 3 includes a sludge holding and delivery system 30. The sludge holding and delivery system 30 has a holding tank 32 that receives substantially raw, wet sludge. The holding tank 32 can be sized to hold a selected volume of wet sludge for continual operation of the system 10 for several days before the holding tank 32 needs to be replenished. For example, in the illustrated embodiment, the holding tank 32 is designed to hold approximately 30 m³ of wet sludge, which provides approximately three days of operation, wherein the system 10 can process approximately 9-10 m³ of sludge per day. The top of the holding tank 32 can be set close to the ground to allow sludge delivery vehicles to easily empty the sludge 12 into the tank. The bottom of holding the tank 32 can be sloped toward an outlet connected to a sludge in-feed assembly 34. In one embodiment, the in-feed assembly 34 can include a fully or partially enclosed conveyor 38, such as an auger or belt conveyor, that transports the wet sludge from the holding tank 32 to an inlet 40 of the sludge dryer assembly 14.

Figure 4:
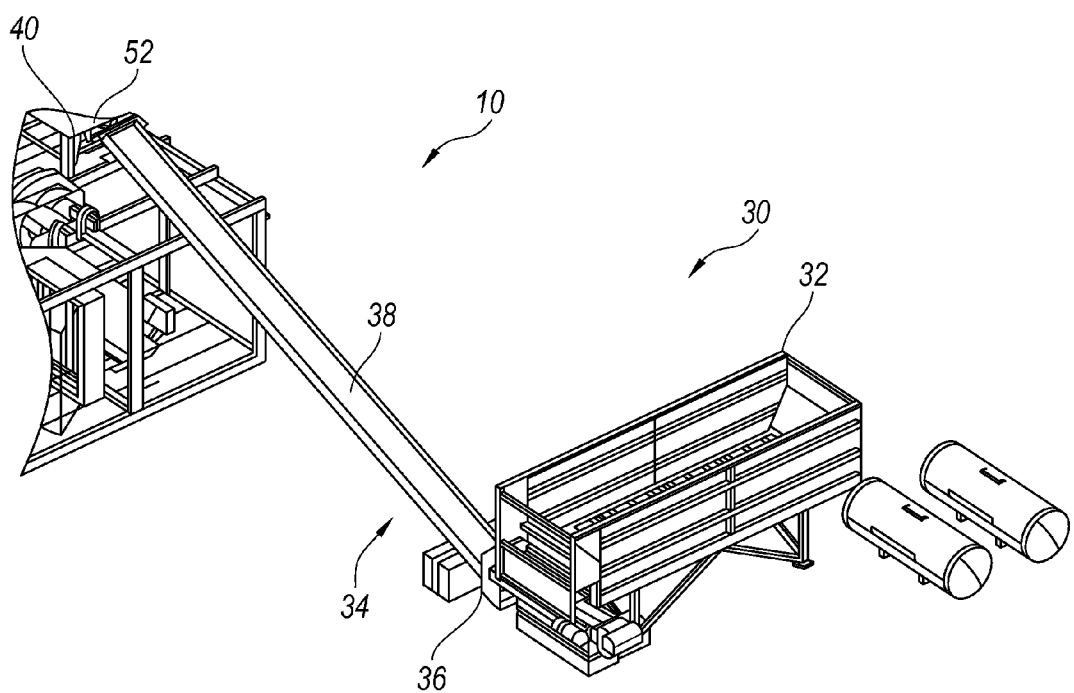
FIG. 4 is an isometric view of an in-feed assembly of an embodiment of the sludge holding and delivery system.

FIG. 4 is an isometric view of a sludge in-feed assembly 34 of an embodiment, wherein the holding tank 32 includes a drag-chain spreader box having an outlet 36 that deposits the wet sludge on the conveyor 38. The conveyor 38 extends upwardly at a selected angle relative to the ground and connects to the sludge dryer assembly 14 adjacent to the inlet 40. In the illustrated embodiment, the conveyor 38 is sloped upwardly at an angle of approximately 30° relative to the ground, although other angles can be used in other embodiments.

Sludge Dryer Assembly

Figure 5:
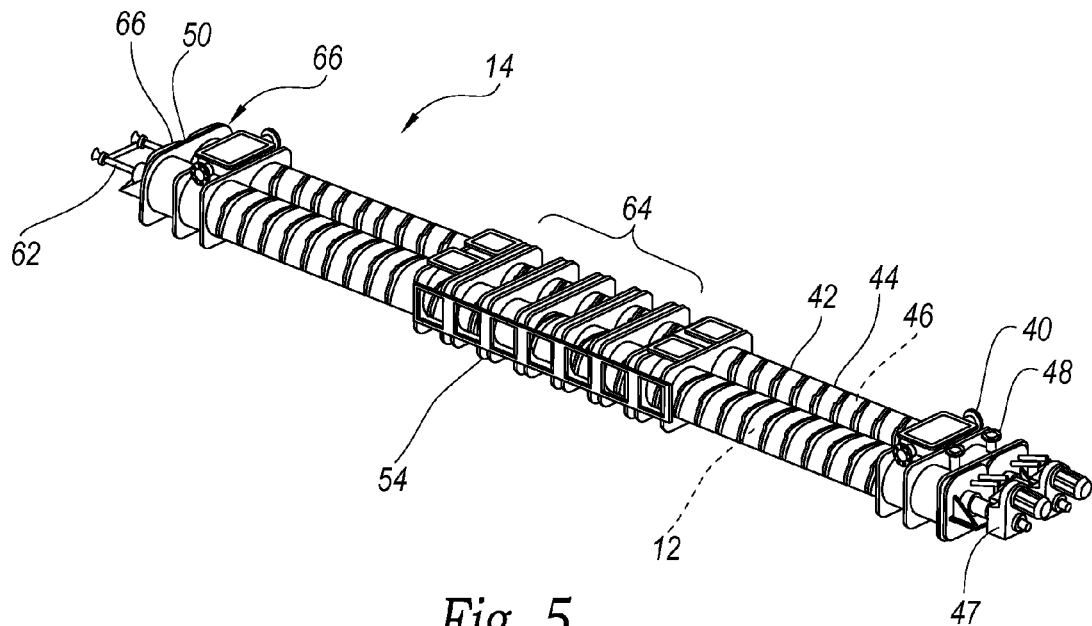
FIG. 5 is an isometric view of a sludge dryer assembly shown removed from the assembly of FIG. 2.
Figure 6:
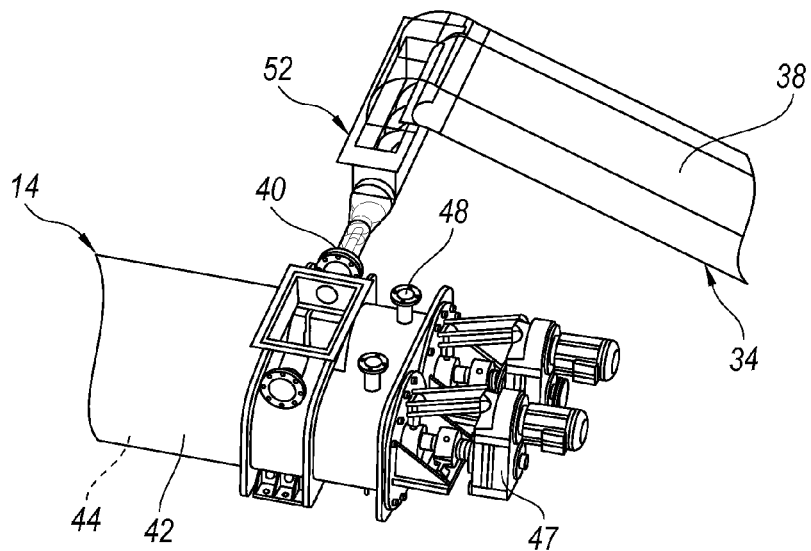
FIG. 6 is an enlarged partial isometric view of an end portion of the sludge dryer assembly connected to a conveyor assembly of the in-feed assembly of FIG. 4.

FIG. 5 is an isometric view of a sludge dryer assembly 14 shown removed from the assembly of FIG. 2. The wet sludge transported from the sludge holding and delivery system 30 (FIG. 3) is fed into a sludge inlet 40 of the sludge dryer assembly 14. As seen in FIG. 6, a sludge transition auger 52 connected to the end of the conveyor 38 of the sludge in-feed assembly 34 feeds the wet sludge into the dryer, assembly's inlet 40 The flow of sludge into the sludge dryer assembly 14 is substantially continuous. FIG. 6 is an enlarged, partial isometric view of an end portion of the sludge dryer assembly 14 that includes the inlet 40. In addition to receiving the wet sludge, the sludge dryer assembly 14 also receives primary steam exhausted from the steam engine 26 of the power plant 22 (FIG. 1). The exhaust primary steam, which exits the steam engine 26 at approximately 207 kPa (approximately 30 psia), flows into one or more tubular shells 42, each of which contains a tubular sludge carrier 44. Heat from the exhausted primary steam boils the sludge in the sludge carrier 44, thereby evaporating water from the sludge (to generate sludge vapor), which dries the sludge to provide the solid fuel material.

The sludge dryer assembly 14 of the illustrated embodiment includes two enclosed large diameter pipes that each form a shell 42 that houses a small diameter pipe forming a hollow sludge carrier 44. Each sludge carrier 44 contains a rotatable, hollow auger 46, and the sludge carrier 44 receives the sludge through the inlet 40 such that the sludge at least partially surrounds the hollow auger 46. In the illustrated embodiment, each shell 42 includes a steam inlet 48 that receives the exhausted primary steam from the steam engine 26 (FIG. 1) such that the high-temperature primary steam flows into the shell's interior area and around the sludge carrier 44, thereby heating the sludge in the sludge carrier 44. Accordingly, the primary steam is physically isolated from the sludge while still being able to transfer heat to the sludge, which boils the sludge and simultaneously cools the primary steam. In addition, a portion of the primary steam entering the sludge dryer assembly 14 flows into the interior area within the hollow auger 46 so as to also heat the sludge through the auger 46. In the illustrated embodiment, each hollow auger 46 is connected to a drive motor 47 that rotates the auger 46 within the sludge carrier 44 and continuously moves the wet sludge axially through the sludge carrier 44 as the sludge is drying. In one embodiment, each drive motor 47 is a dedicated, five-horsepower, inverter-duty, three-phase electrical motor controlled by an independent variable frequency drive. Other embodiments can use other drive motors.

The two sludge carriers 44 are interconnected at their ends by transfer housings 50 that each have sludge passageways therethrough that allow the sludge to flow axially through one sludge carrier 44 in one direction, through the sludge passageway in the transfer housing 50, and axially through the other sludge carrier 44 in the other direction.

Figure 7:
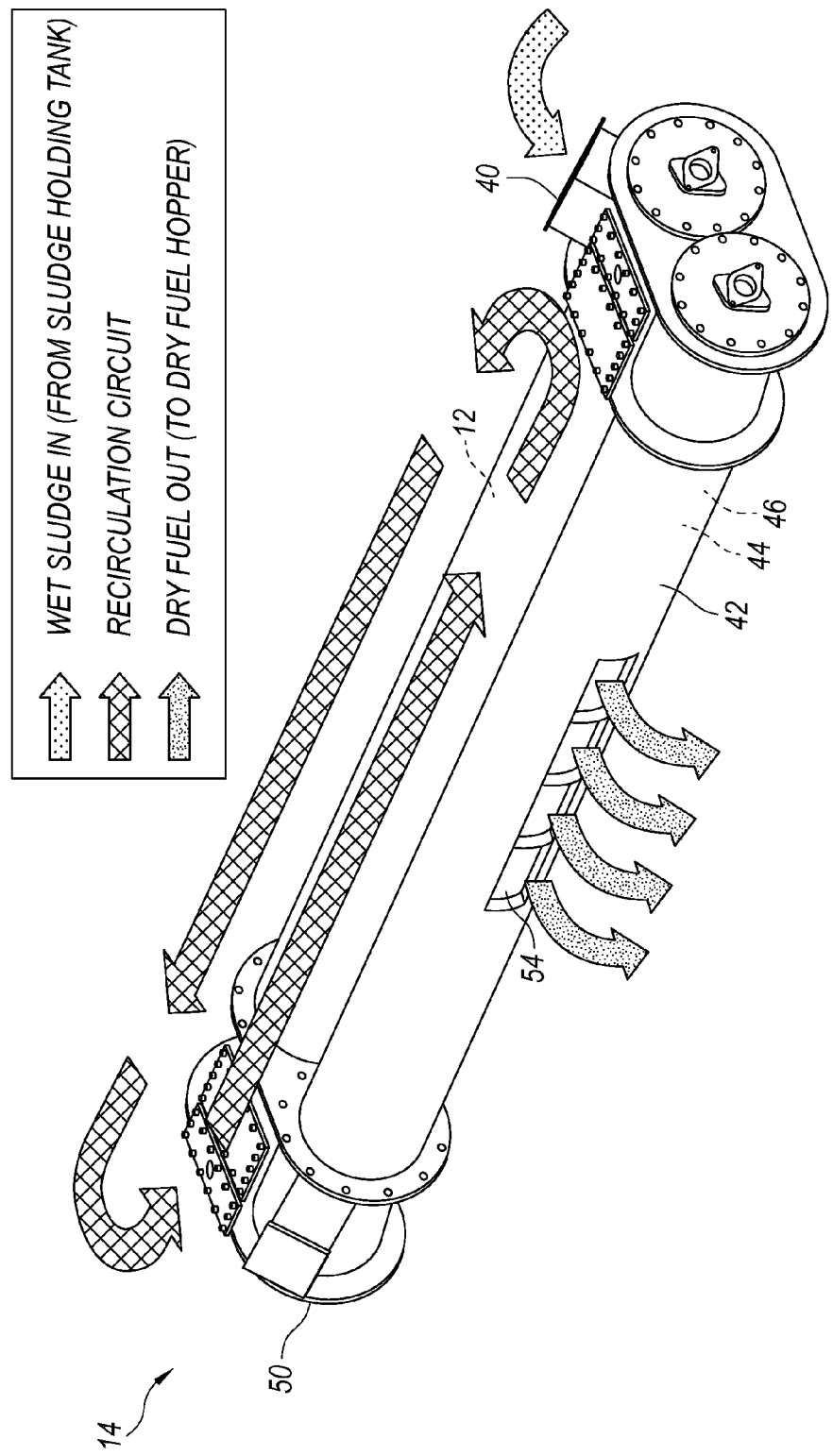
FIG. 7 is a schematic isometric view of the sludge flow during processing in the sludge dryer assembly of FIG. 5.

FIG. 7 is a schematic isometric view of the sludge flow in the sludge dryer assembly from the inlet 40. As the sludge cycles through the sludge carriers 44, the water in the sludge is boiled off. When the solid fuel material from the sludge is sufficiently dry, it exits the sludge dryer assembly 14 through one or more dried fuel outlets 54 formed in the side of the sludge carrier 44 and corresponding shell 42. The dry fuel outlet 54 is sealed between the sludge carrier 44 and the shell 42 so as to maintain isolation of the sludge material from the primary steam. In the illustrated embodiment, the dry fuel outlets 54 are rectangular openings, although the dry fuel outlets can have other shapes (i.e., square, round, elliptical, etc.) and sizes.

In operation, the sludge level within the sludge dryer assembly 14 increases as additional wet sludge is delivered into the sludge carrier 44 by the transition auger 52 (FIG. 6). The solids within the sludge moving through the sludge carrier 44 typically are sufficiently dried by the time they reach the dry fuel outlets 54, and the sufficiently dried solid fuel material spills out of the dry fuel outlet 54 and into a dry fuel hopper 56 (FIG. 2), discussed below. To ensure that the sludge is moving through the sludge carrier 44 via the rotating hollow augers 46 remains friable, an adequate amount of dried sludge will recirculate back into the beginning of the drying system adjacent to the inlet 40. Some of the sludge may be recirculated through the sludge assembly multiple times before moving into the dry fuel hopper 56 (FIG. 2).

This recirculation of the drying sludge also prevents the sludge from reaching a condition referred to as the "sticky" phase, wherein the sludge moisture content is about 0.3523 kg $H_2O$ per kilogram of dry matter or 25% to 75% dry solid. Unlike in the "wet" or "paste" zones where the sludge displays fluid-like properties, in the "sticky phase" the contact between the sludge and heated wall of the sludge carrier 44 decreases dramatically, which negatively affects the evaporation rate. When the sludge is dried past the "sticky" phase to the "granular" phase, the drying sludge increasingly maintains homogeneous contact with the heated wall of the sludge carrier 44, which allows the evaporation rate to return back to its original value. In addition to decreased heat transfer effectiveness, material in the "sticky" zone exhibits considerable shear strength, such that the sludge material is more likely to adhere to the rotating auger 46 rather than being conveyed by it. Recirculation of some dry sludge material helps to ensure that the contents of the sludge dryer assembly always remain within or close to the "granular" zone, thereby avoiding the "sticky" zone.

In the illustrated embodiment shown in FIG. 5, the concentric tubular design of the sludge dryer assembly 14 is very durable. The dry fuel outlets 54, however, penetrate the sidewalls of the pressurized tubular shell 42, which may weaken the tubular structure. Accordingly, one or more stiffening ribs 64 are attached to the shells 42 around the dry fuel outlets 54 to help maintain structural integrity and to keep the tubular structures from plastically deforming under the heat and pressure of the primary steam within the dryer assembly.

In addition to removing the dried solid fuel material from the sludge carriers 44, the sludge vapor liberated from the sludge is removed from the sludge dryer assembly 14 through vapor outlet ports 66 in communication with the interior area of each sludge carrier 44. The sludge vapor flows from the vapor outlet ports 66 through conduits to the water treatment system 16 (FIG. 1), which is discussed in greater detail below. In the illustrated embodiment, at least one vapor outlet port 66 is provided at each end of the sludge dryer assembly, although the outlet ports could be located at other positions.

As heat from the primary steam is transferred to the sludge, the primary steam cools, such that the sludge dryer assembly 14 acts as a condenser, wherein the primary steam condenses within the shells 42 to primary liquid water. The condensate remains isolated from the sludge and is removed from the shells 42 by a condensate siphon tube assembly that extracts the primary liquid water and directs it into one or more primary water lines 62 that carry the primary liquid water away from the sludge dryer assembly 14 along the primary water circuit 21 (FIG. 1). In the illustrated embodiment shown in FIG. 2, the sludge dryer assembly 14 is mounted in the system 10 such that the shells 42 and sludge carriers 44 are tilted relative to horizontal, such as approximately a 1-degree tilt, to facilitate extraction of the primary water by the siphon tube assembly. The extracted primary liquid water is then cycled back along the primary water circuit 21 for use by the boiler 20 and the steam engine 26 before returning again as steam to the sludge drying assembly 14.

Figure 8:
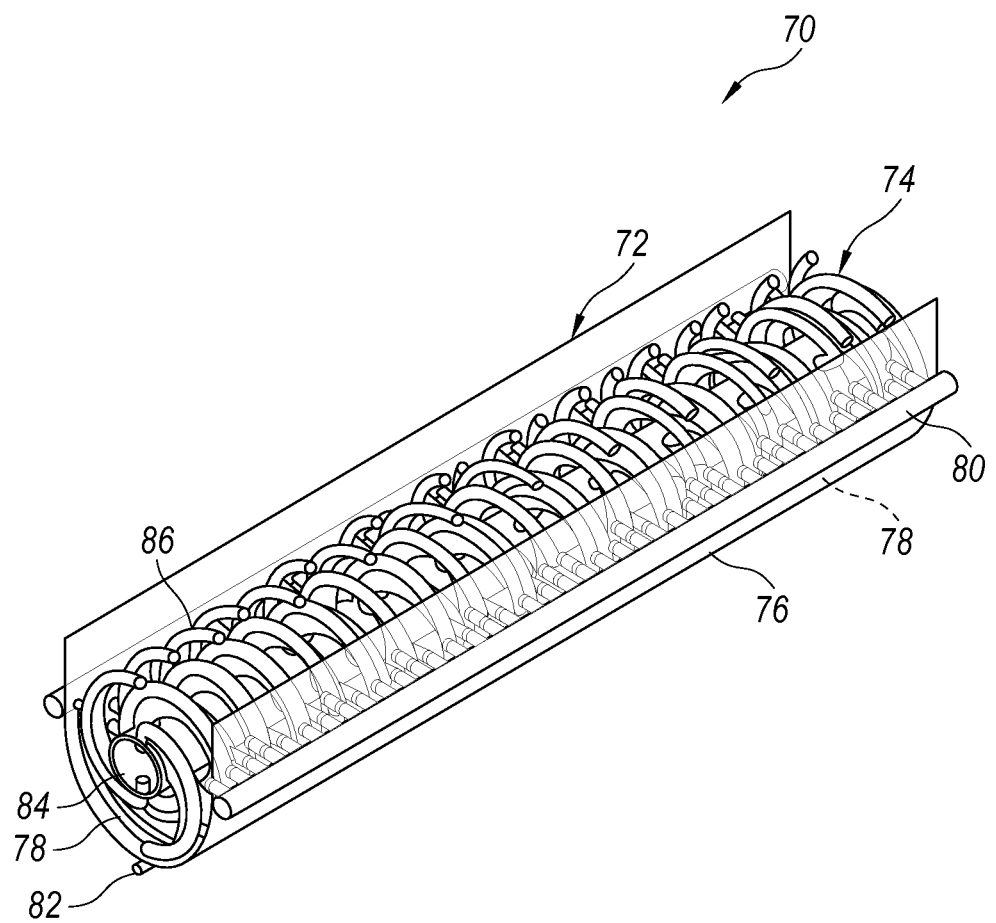
FIG. 8 is a partial isometric view of a sludge dryer assembly having a steam-heated auger rotatably positioned in a steam-heated trough that contains a flow of sludge.

FIG. 8 is a partial isometric view of another embodiment of a sludge dryer assembly 70 that includes a plurality of rotating and stationary pressure vessels heated by the exhausted primary steam up to approximately 100 psig and 328° F. to mix and dry the sludge. The illustrated dryer assembly 70 has a closed, sealed trough 72 containing a rotatable auger 74 that moves the sludge axially along the trough 72 toward an outlet at one end of the trough 72. The trough 72 receives the flow of wet sludge through an inlet at one end such that at least a portion of the auger 74 is within the sludge. The trough 72 is illustrated in FIG. 8 without showing the lid or ends for purposes of clarity to show the components within the trough 72. The lid and ends are sealed to the trough body 76 so as to fully contain the sludge and the liberated sludge vapor during the drying process. In one embodiment, a hydraulically operated lid permits full and easy access to all of the internal components of the sludge dryer assembly 70, as well as sealing all of the vapors, fumes, and gases within the trough 72. Accordingly, the sludge vapor and volatiles from the headspace in the trough 72 are captured and re-processed for purification (i.e., the water vapor) and/or re-combustion (i.e., the gases and/or volatiles).

Figure 9:
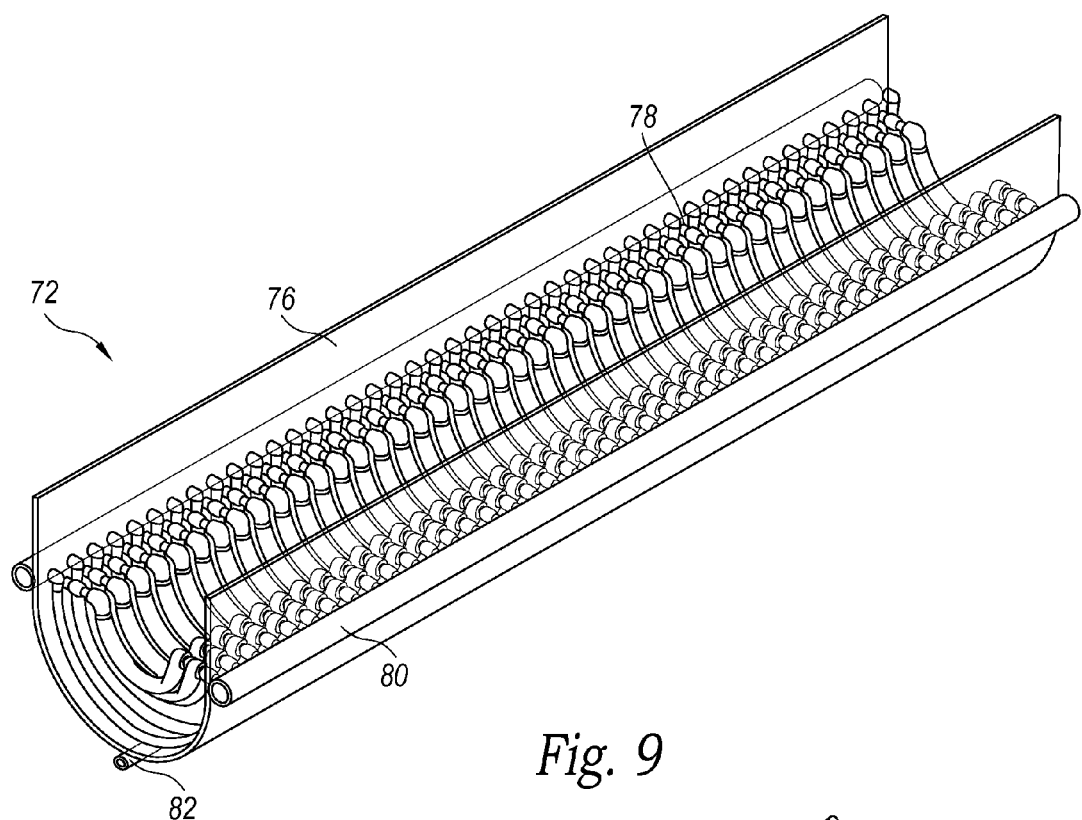
FIG. 9 is an enlarged isometric view of the trough shown separated from the auger of FIG. 8.

FIG. 9 is an enlarged isometric view of the steam-heated trough 72 shown with the auger 74 removed. The trough 72 contains a plurality of stationary, spaced apart curved steam pipes 78 interconnected by elongated manifold pipes 80 that receive the high temperature exhausted primary steam from the steam engine 26 (FIG. 1) and evenly distribute the primary steam to the curved steam pipes 78. Accordingly, as the sludge enters the trough 72 near the inlet and moves along the trough 72 via the auger 74, the sludge moves over at least a portion of the curved steam pipes 78, thereby boiling and drying sludge. By the time the sludge reaches the outlet at the end of the trough body 76 the sludge is sufficiently dried. In addition, the primary steam condenses within the curved steam pipes 78, and the condensate is collected in a return manifold pipe 82 connected to the primary water circuit 21.

Figure 10:
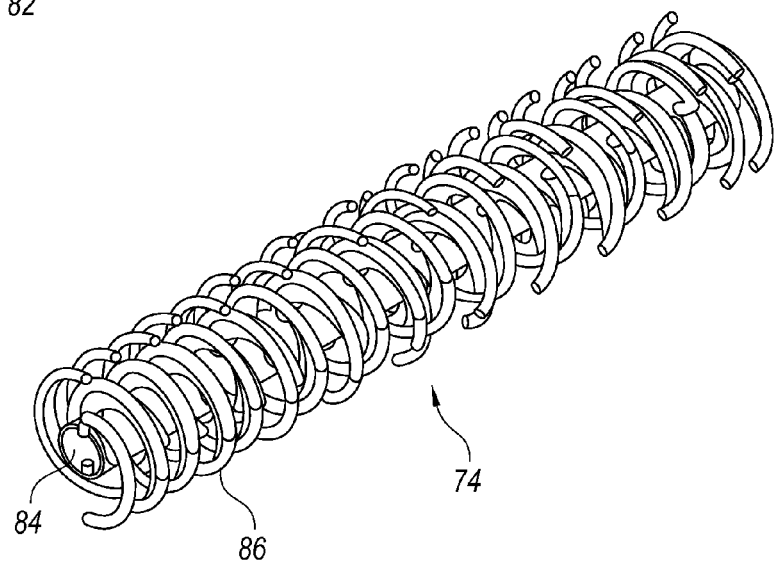
FIG. 10 is an enlarged isometric view of the auger shown separated from the trough of FIG. 8.

FIG. 10 is an enlarged isometric view of the steam-heated, pressurized auger 74 shown separated from the trough 72. The auger 74 has a hollow central shaft 84 that receives the exhausted primary steam. The auger 74 also has a plurality of curved steam pipes 86 that communicate with the interior of the central shaft 84 and extend radially in a spiral manner away from the central shaft 84. Accordingly, the curved steam pipes 86 receive primary steam from the central shaft 84.

The auger 74 is configured to rotate within the trough 72 so that the curved steam pipes 86 pass through the spaces between the steam pipes 78 in the trough 72. The auger's curved steam pipes 86 can be slightly angled relative to the central shaft 84 so as to act as propulsion members that engage and push the sludge axially through the trough over the curved steam pipes 78, thereby heating and boiling the sludge. The hot primary steam in the central shaft 84 and in the curved steam pipes 86 also heats the sludge, which results in the primary steam condensing within the auger 74. One end of the auger's central shaft 84 has a condensate outlet that directs the condensate out of the auger and along the primary water circuit 21 (FIG. 8) as primary liquid water. In the illustrated embodiment, the rotating auger 74 provides a mixing action that provides a self-leveling effect that causes the sludge to move from one end of the trough 72 to the other. The auger 74 also meters the dried solid fuel material out of the dried fuel outlet. In at least one embodiment, one or more dry fuel augers can be connected to the trough 72 adjacent to the dried fuel outlet to carry the dried solid fuel material to the dried fuel hopper 56.

Figure 11:
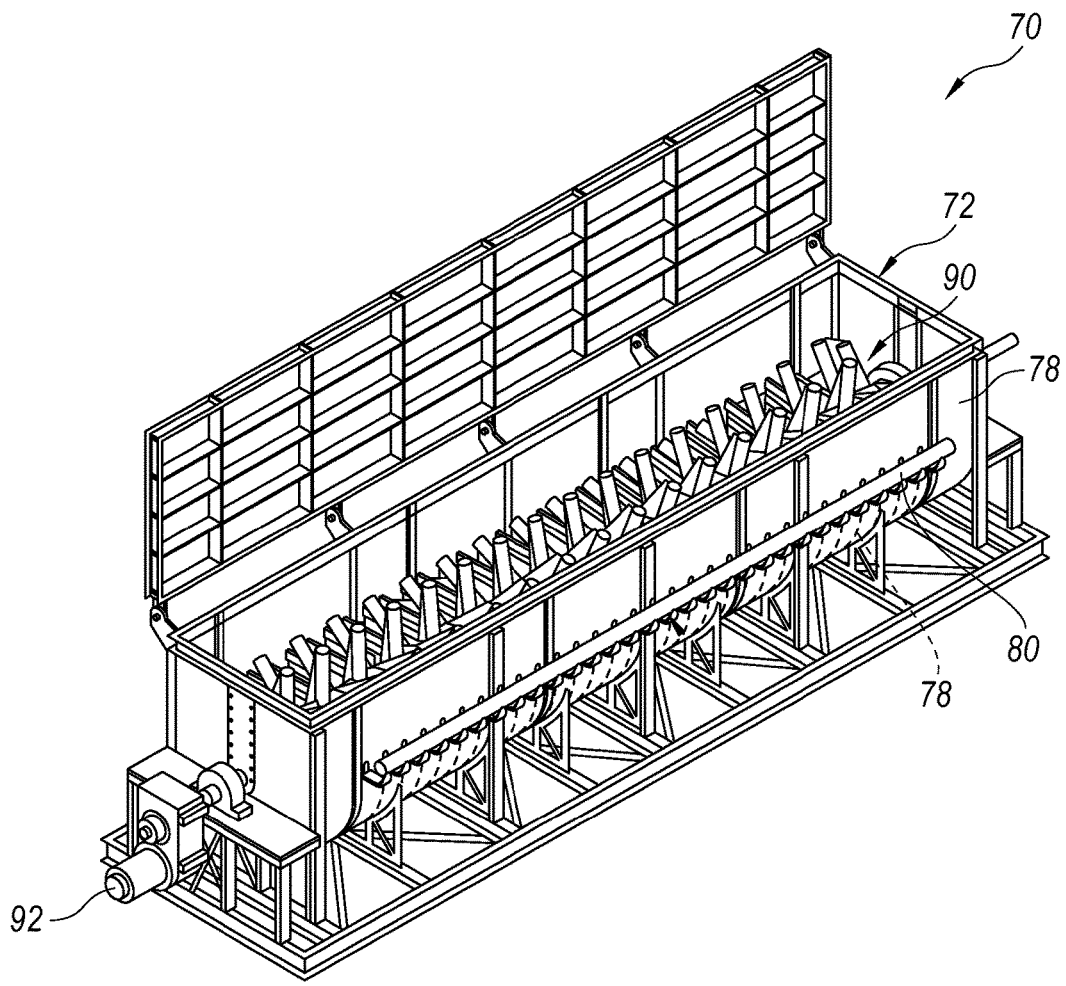
FIG. 11 is a partial isometric view of a sludge dryer assembly of another embodiment having a steam-heated auger member rotatably positioned in a steam-heated trough that contains a flow of sludge.
Figure 12:
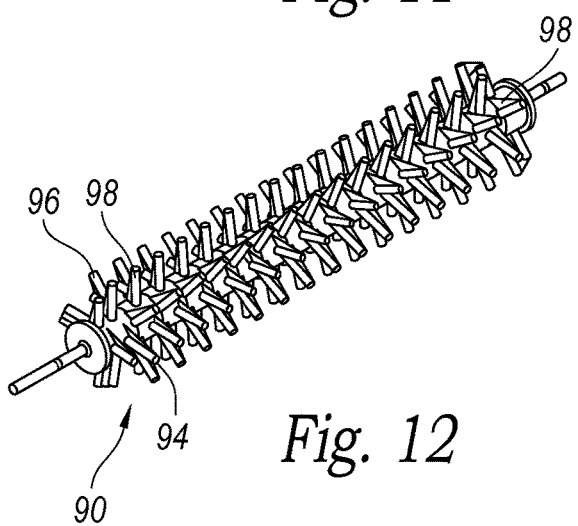
FIG. 12 is an enlarged isometric view of the steam-heated auger shown separated from the trough of FIG. 11.

FIGS. 11 and 12 are isometric views of another embodiment of the sludge dryer assembly 70 that has the trough 72 with the trough body 76, the curved steam pipes 78, and the axially extending manifold pipes 80 substantially similar to the sludge dryer assembly 70 discussed above in connection with FIG. 8. Accordingly, the trough 72 with the curved steam pipes 78 and manifold pipes 80 define a stationary pressure vessel heated by the primary steam. In this alternate embodiment, an auger 90 is rotatably positioned within the trough 72 and driven by a drive motor 92.

The auger 90 has a substantially hollow central shaft 94 connected to a plurality of hollow, straight finger pipes 96 that project radially from the central shaft 94. Each of the finger pipes 96 includes a support web 98 secured to the central shaft 94 to provide additional strength and rigidity to the respective finger pipe 96 as the auger 90 rotates and the steam-heated finger pipes 96 move through the sludge and slowly move the drying sludge axially toward the dry fuel outlet. In one embodiment, the support webs 98 can also be angled relative to the central shaft's longitudinal axis, and the support webs 98 may engage a portion of the sludge to facilitate mixing and/or to incrementally move the drying sludge along the length of the trough 72.

For purposes of an example, the central shaft 94 of the auger 90 is a rigid, 24-inch-diameter pipe operatively connected to approximately 140 protruding 5-inch finger pipes 96 distributed around the pipe along its length. The finger pipes 96 extend internally into the steam-filled central shaft 94 to ensure proper condensate removal upon condensation of the primary steam during operation. Each of the finger pipes 96 and associated support web 98 are configured to accommodate the force of the drive motor's full torque if that torque was fully applied to the end of a single one of the finger pipes 96, while maintaining an actual material stress below the material allowable stress for the auger's designed pressure and temperature, such as approximately up to 100 psig and 328° F. In one embodiment, the finger pipes 96 are oriented in a generally helically arranged pattern down the length of the central shaft 94 in a configuration so no two finger pipes 96 initially engage the sludge material at precisely the same moment, thereby evenly distributing the impact loads throughout the auger's full rotation. In addition, neighboring planar finger pipe groupings are rotationally offset by approximately 45° to facilitate the sludge flow through the trough 72 during the drying process.

As indicated above, the sludge vapor generated within the trough 72 is extracted through a vapor outlet. In one embodiment, the vapor outlet is positioned adjacent to the trough's end panel that the sludge moves toward during the drying process. The sludge vapor removed from the trough 72 flows into a water treatment system 16 where the sludge vapor is cleaned and collected, as discussed in greater detail below.

Figure 13A:
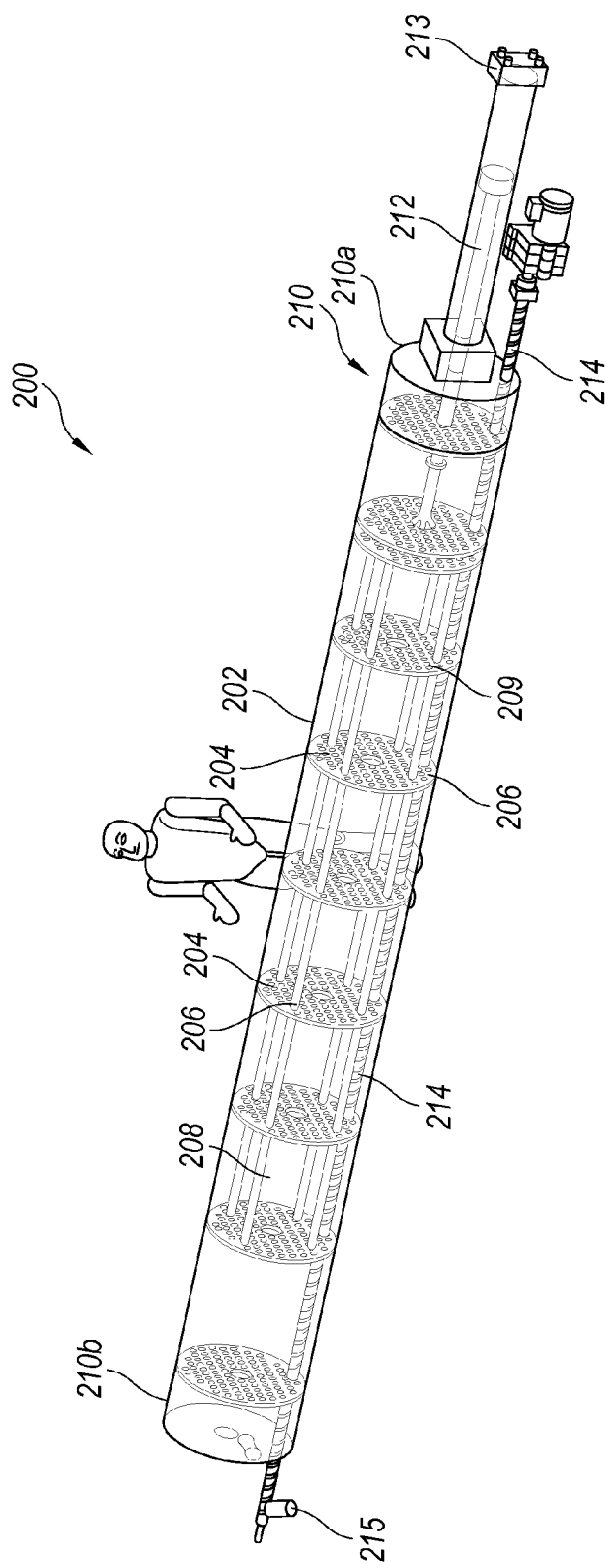
FIGS. 13A and 13B are isometric views of a high-pressure, first-stage sludge dryer assembly in accordance with an embodiment of the present technology.
Figure 13B:
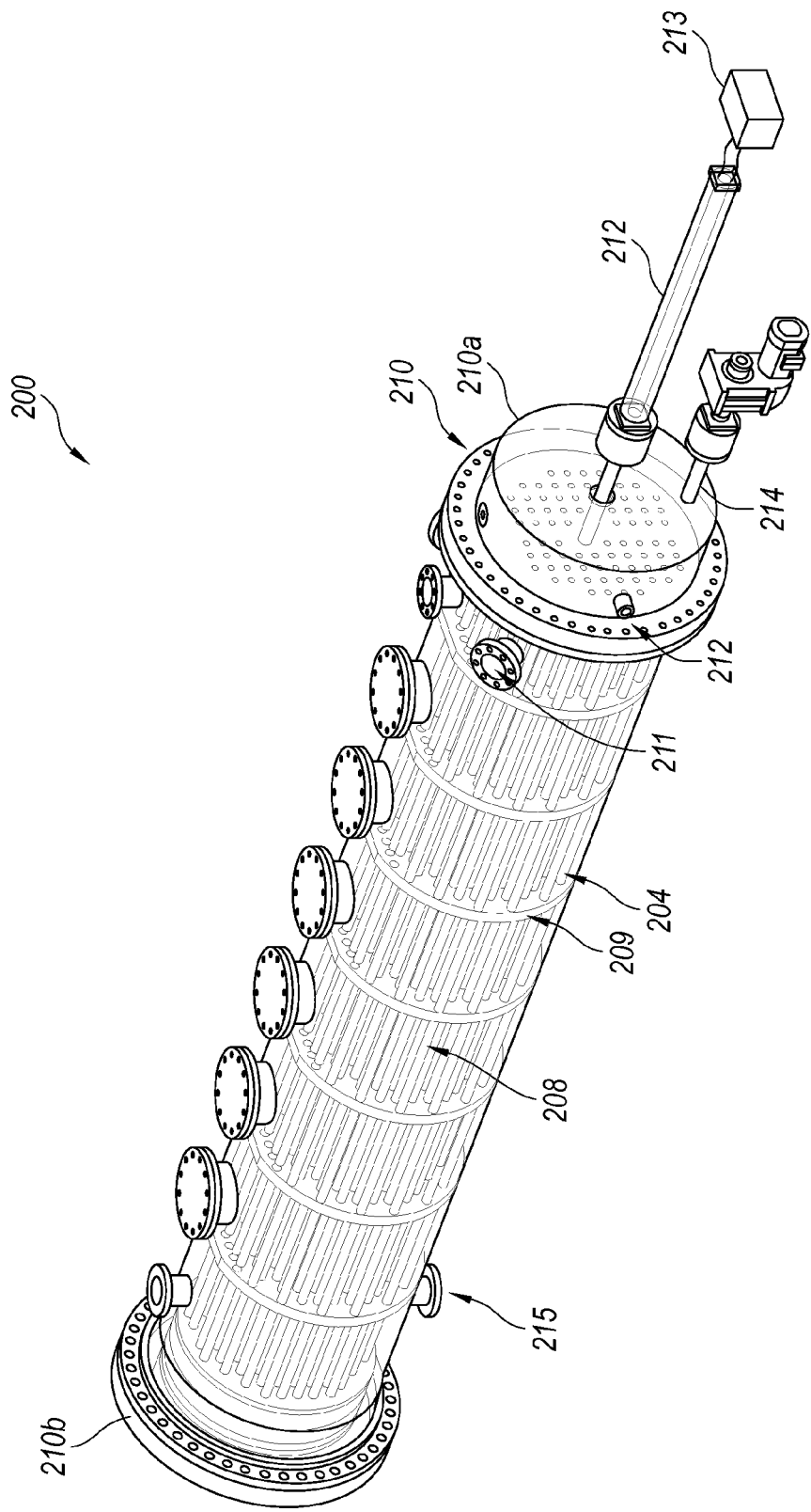

In one embodiment wherein the system 10 is used to process very wet sludge (e.g., sludge having a solid content of approximately 15% solid materials or less). The system 10 dries the wet sludge utilizing a two-stage sludge dryer system that includes a high pressure first-stage dryer assembly 200 and a low pressure second-stage dryer assembly 220. FIGS. 13A and 13B are isometric views of a high-pressure first-stage dryer assembly 200 in accordance with an embodiment of the present technology. The first-stage dryer assembly 200 includes an elongated, large diameter outer pipe 202 that contains a plurality of spaced apart, axially aligned scraper discs 204 structurally interconnected to each other by one or more tie rods 205. For purposes of clarity for this discussion, the outer pipe 202 is shown in FIGS. 13A and 13B as generally transparent to avoid obscuring the internal components from view.

Each scraper disc 204 has a plurality of apertures 206 that axially align with the apertures 206 in the other scraper discs 204. A plurality of steam tubes 208 extend substantially along the length of the outer pipe 202 and through the aligned apertures 206 in the scraper discs 204. The scraper discs 204 also include bearings 209 that engage the inside surface of the outer pipe. The ends of the outer pipe 202 are connected to manifold portions 210 that communicate with the interior of the steam tubes 208. One of the manifold portions 210 (i.e., an inlet manifold 210a) has a steam inlet port 212 connected to the primary water circuit and configured to receive high temperature primary steam exhausted from the steam engine 26 (FIG. 1). The primary steam flows from the inlet manifold 210a into the steam tubes 208 within the outer pipe 202.

The outer pipe 202 has a sludge inlet port 211 that directs a flow of very wet sludge into the pipe's interior area such that the wet sludge directly engages the high temperature steam tubes 208. The structurally interconnected scraper discs 204 are connected to a reciprocating drive shaft 212 that sealably extends through the inlet manifold 210a and connects to an actuator 213, such as a hydraulic cylinder. The actuator 213 is operable to push and pull the drive shaft 212, thereby moving the scraper discs 204 as a unit axially back and forth within the outer pipe 202 and through the wet sludge. The high temperature primary steam in the steam tubes 208 boils the water in the sludge to generate sludge steam, thereby decreasing the water content of the sludge.

An elongate auger assembly 214 sealably extends through the inlet manifold 210a and into the interior area of the outer pipe for engagement with the sludge. As the sludge thickens due to the water evaporation, the auger assembly 214 helps move the thickened sludge through the outer pipe 202 to a sludge outlet port 215 at the end of the outer pipe 202 opposite the inlet port 211 of the dryer assembly 200. The extracted thickened sludge is then passed through a throttle 220 to decrease the pressure and directed into the second-stage dryer assembly 220 (FIG. 14), discussed in greater detail below.

Figure 14:
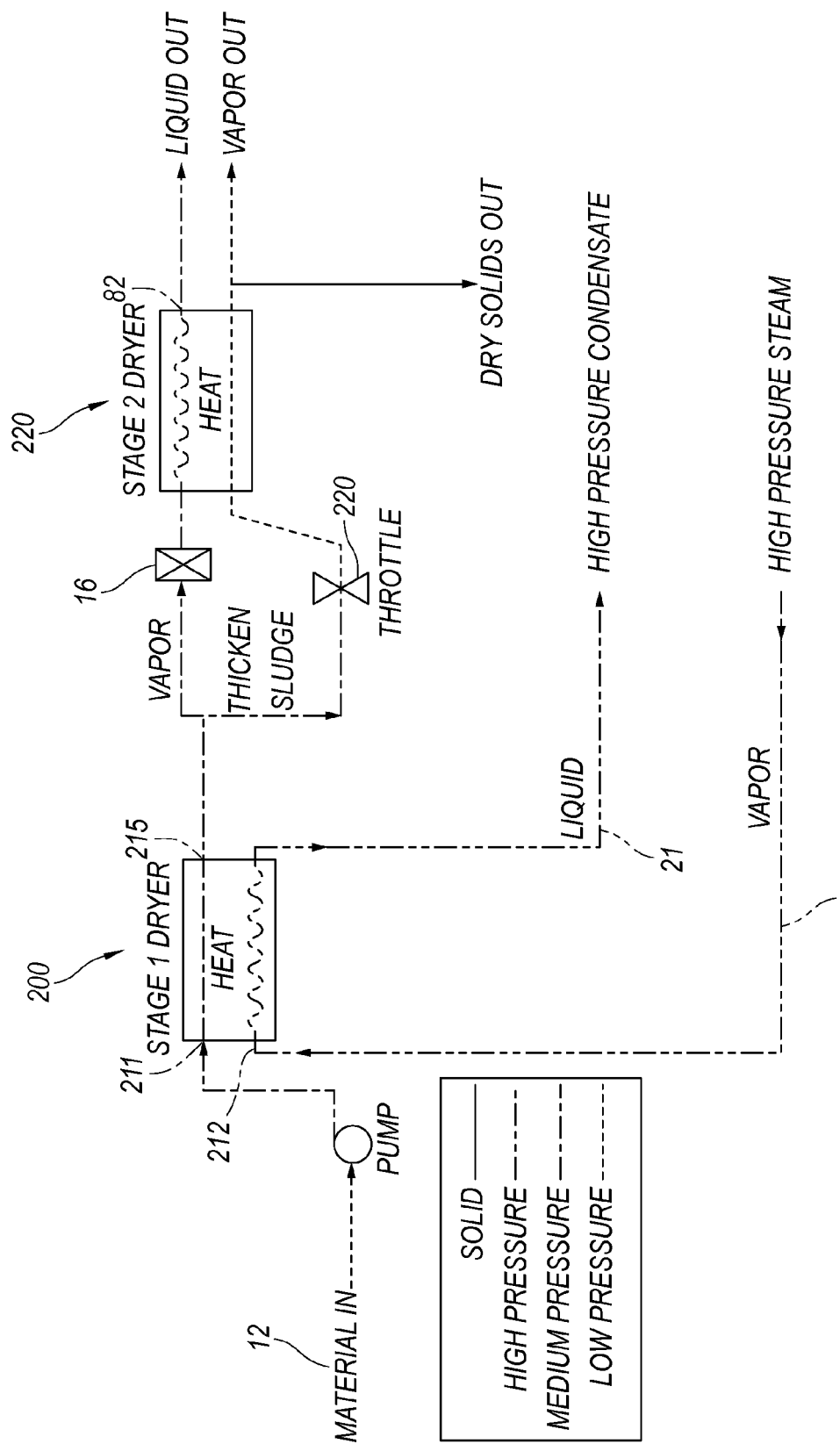
FIG. 14 is a schematic flow chart of a two-stage sludge dryer system in accordance with an embodiment of the present technology.

As the primary steam in the steam tubes 208 heats and boils the wet sludge, the primary steam condenses and the resulting primary liquid water flows out of the steam tubes 208 into a collection area in the outlet manifold 210b. The primary liquid water flows out of the collection area through a primary water outlet port and into a conduit coupled to a radiator 190 (discussed below) that cools the liquid water in the primary water circuit 21. The sludge vapor liberated from the sludge is heated and maintained a high temperature during the drying process, which results sterilizing the sludge vapor while in the outer pipe 202. As seen in FIG. 14, the sludge vapor is extracted from the outer pipe 202 through a recovery port 216 and into a sludge vapor outlet conduit 218 that carries the sludge vapor to the water treatment system 16. The sludge vapor is then filtered via a cyclone, one or more pre-filters (~25 micron filter), and one or more fine filters (~1 micron). The filtered, sterilized sludge vapor is then directed into the second-stage dryer assembly 220.

In the illustrated embodiment, the second-stage dryer assembly 220 is substantially identical to the sludge dryer assembly of FIGS. 8-10 or FIGS. 11-12, except that the high temperature steam that passes into the curved steam pipes 78 in the trough 72 and into the rotating auger 74 or 90 is the filtered, sterilized sludge vapor from the first-stage dryer assembly 200 (FIG. 13), rather than the high temperature primary steam from the steam engine. In this embodiment, the heat from the filtered, sterilized sludge vapor from the first-stage dryer assembly 200 is used to dry the fecal sludge in the second-stage dryer assembly 220. Accordingly, this two stage sludge dryer system allows twice as much sludge to be processed with substantially the same amount of primary water.

After the heated, pressurized sludge vapor flows through the curve pipes 78 and/or the auger 74/90, and the sludge vapor condenses. The resulting condensate extracted from the return manifold pipe 82 and from the auger's hollow central shaft 84 flows to the water treatment system 16. In addition, the drying process within the second-stage dryer assembly 220 boils water out of the drying fecal sludge, and that sludge vapor exits the trough 72 of the dryer assembly 70 and flows to the water treatment system 16 (FIG. 15).

Water Treatment System

Figure 15:
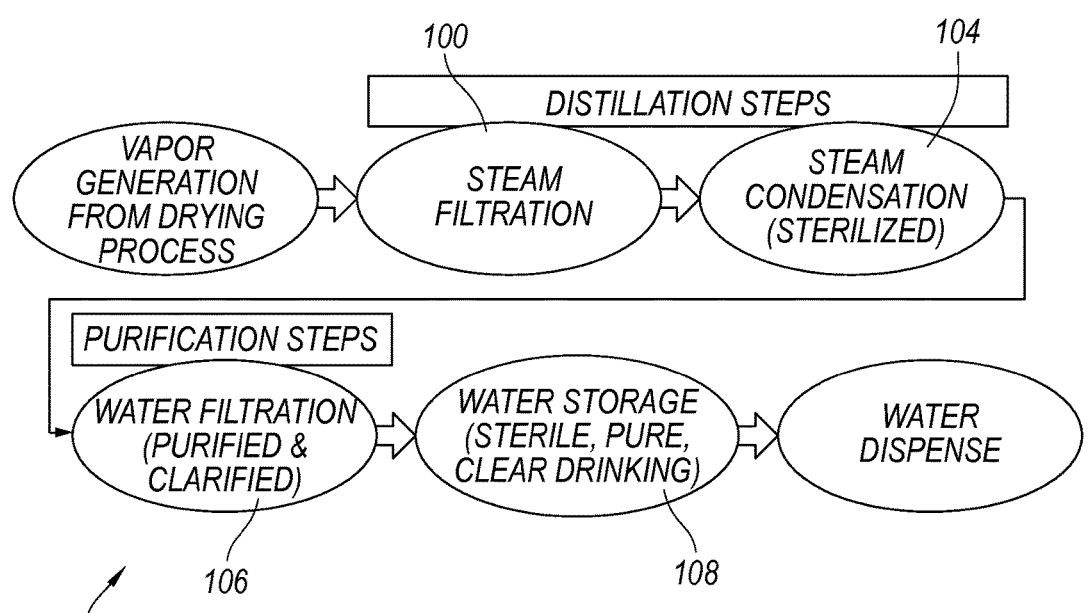
FIG. 15 is a schematic flow chart of a potable water treatment system of the waste processing system of FIG. 1.

FIG. 15 is a schematic flow chart of the water treatment system 16. The sludge vapor flows into a steam filtration system 100 that includes a cyclone, which separates the steam from other particulates that may be in the sludge vapor. The separated sludge steam is then passed through one or more pre-filters, such as a large pore filter (i.e., a 25 micron filter), and then through a fine steam filter (i.e., a 1 micron filter). The filtered sludge steam then flows to the condenser 104 that condenses the sludge steam and collects the resulting sterile liquid water. While the filtered sludge steam and the resulting condensed water may include some impurities, the filtered steam and condensed liquid water is pathogen free because the sludge vapor was exposed to very high temperature long enough to kill any pathogens in the sludge vapor.

The sterile water is then purified by an aeration process, then a bleaching process, and then a filtration process through selected purification filter, such as one or more charcoal filters. The purified, clean, potable water is then captured in a clean water storage tank 108, from which the clean water can be dispensed.

Figure 16:
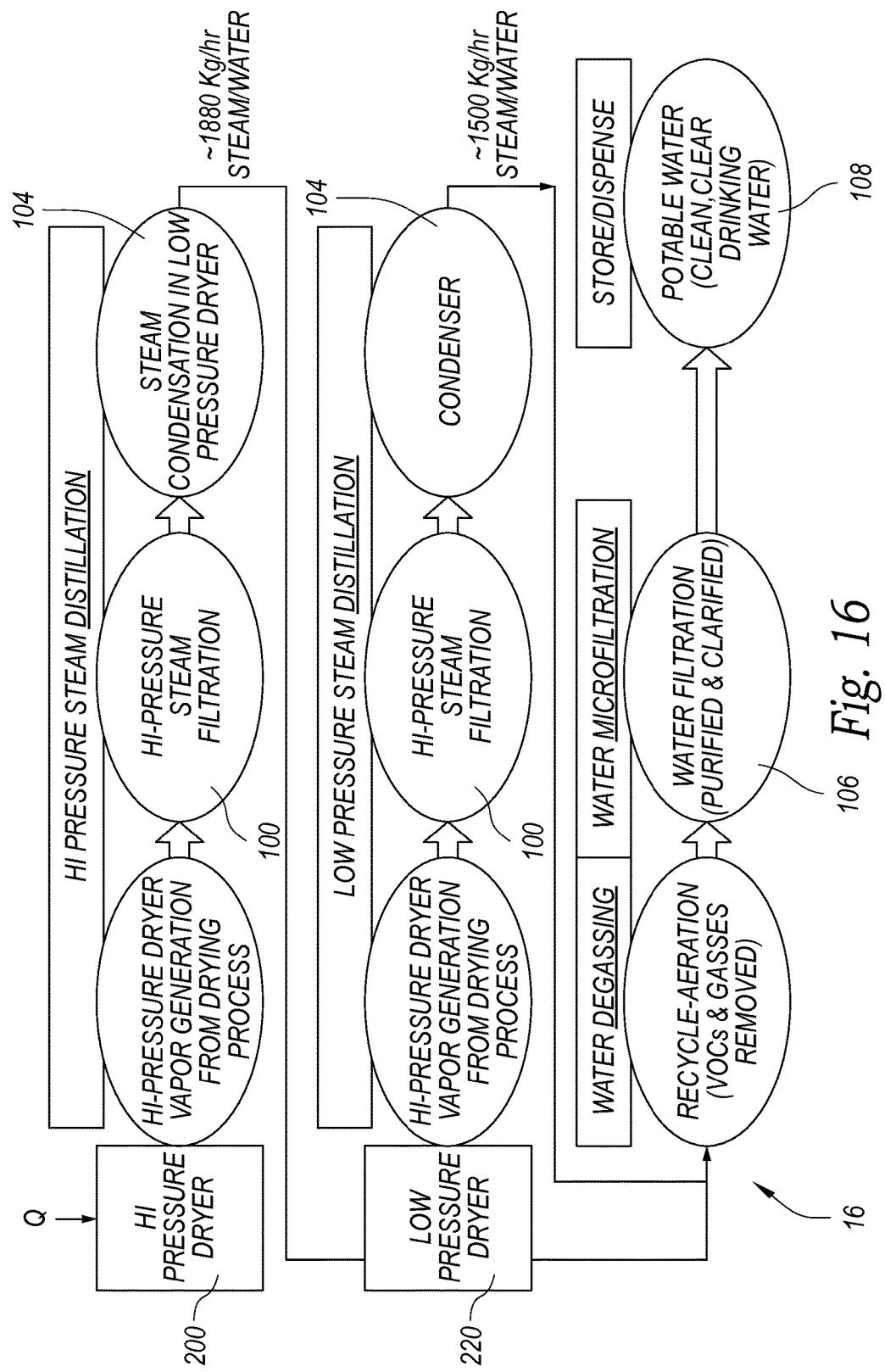
FIG. 16 is a schematic flow chart of a potable water treatment system of another embodiment of the waste processing system FIG. 1.

FIG. 16 is a schematic flow chart of the water treatment system 16 in connection with an embodiment using the two-stage dryer assembly. In this embodiment, the high-pressure sludge vapor from the first-stage dryer assembly 200 flows through a water treatment system 16 and is filtered, as discussed above, and then used in the second dryer stage assembly 220. The condensate from that sludge vapor in the second dryer stage assembly 220 is collected and passed through the water treatment system 16 where it is purified via the aeration, bleaching, and filtration processes, as discussed above. The sludge vapor from the second-stage dryer assembly 220 entering the water treatment system 16 is also filtered (i.e., with the cyclone, pre-filter, and fine filter), condensed, and the resulting condensate is purified and collected in the storage tank 108.

Dried Solid Fuel Handling System

Figure 17:
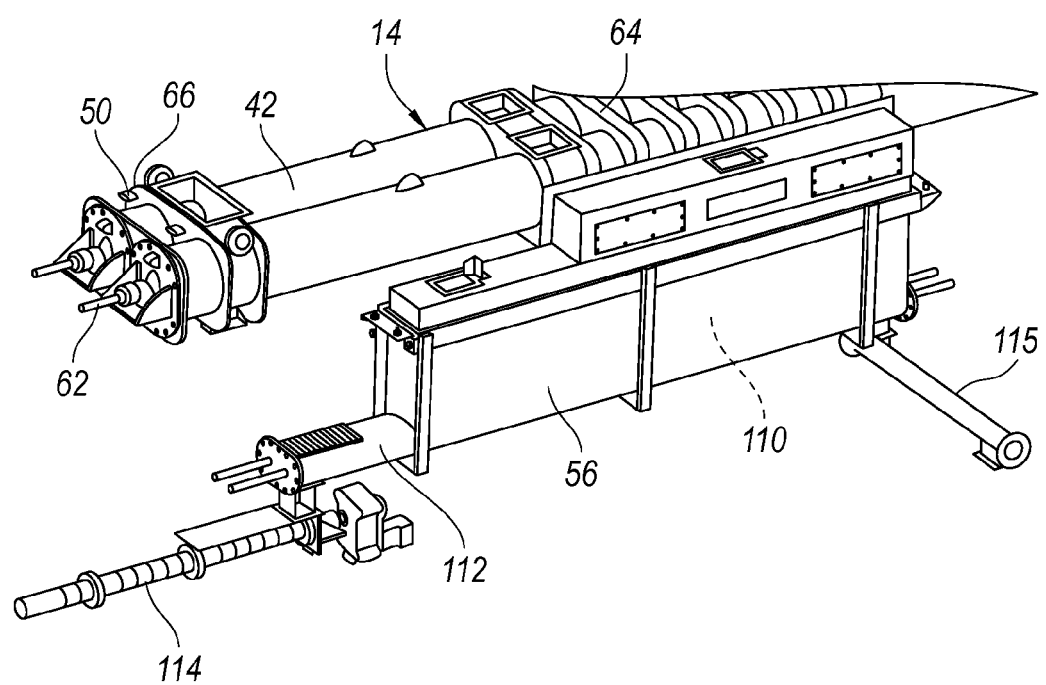
FIG. 17 is an isometric view of a dry fuel bin assembly attached to the sludge dryer assembly of FIG. 5.
Figure 18:
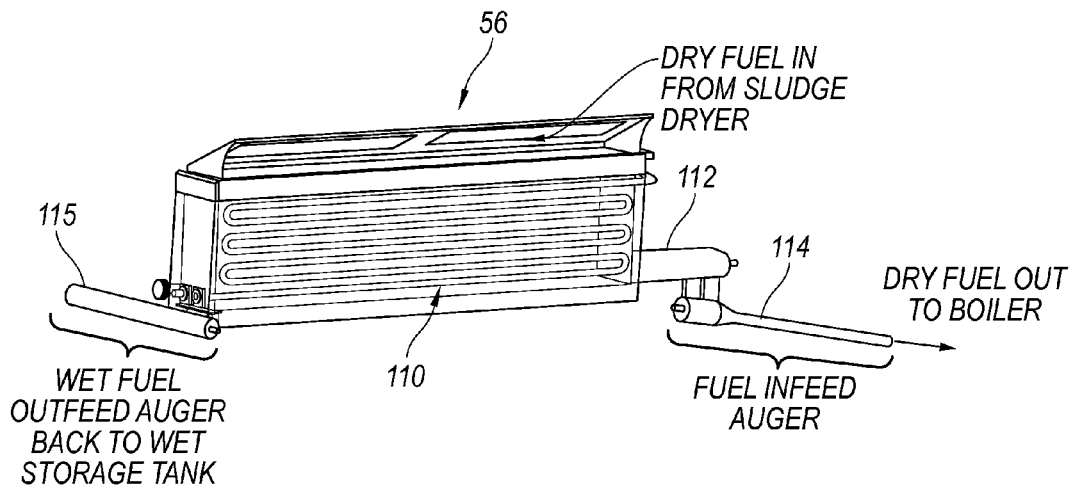
FIG. 18 is an enlarged, partially transparent isometric view of the dry fuel bin assembly of FIG. 17 shown removed from the sludge dryer assembly.

Returning now to the dried solid fuel material, as it exits the sludge dryer assembly 14/70/200/220 as discussed above, dried solid fuel material enters the dry fuel hopper 56. FIG. 17 is an isometric view of a dry fuel hopper 56 attached to the sludge dryer assembly 14 adjacent to the stiffening ribs 64. FIG. 18 is an enlarged, partially transparent isometric view of the dry fuel hopper 56 shown removed from the sludge dryer assembly 14. The dry fuel hopper 56 of the illustrated embodiment includes a bin that receives the dried solid fuel material through an open top side. A heating coil 110 is attached to the side of the bin and heats the bin to ensure no condensation of liquid water from any source gets to the dried solid fuel material. The heat from the heating coil 110 can also further drive the solid fuel material. In one embodiment, the fuel bin heating coil 110 can be a steam coil that receives a portion of the sludge vapor generated by the sludge dryer assembly 14 (FIG. 17), such that the contents of the bin are preheated to above approximately 120° C. (240° F.).

In the event that water or moisture somehow get into the hopper 56 and soaks the dried solid fuel material, or if that the dried fuel solid material is too wet to efficiently burn, then the hopper 56 will need to be emptied. Accordingly, the hopper 56 includes a wet fuel out-feed auger 115 that will direct the wet fuel back to the wet sludge holding tank 32 (FIG. 1).

Figure 19:
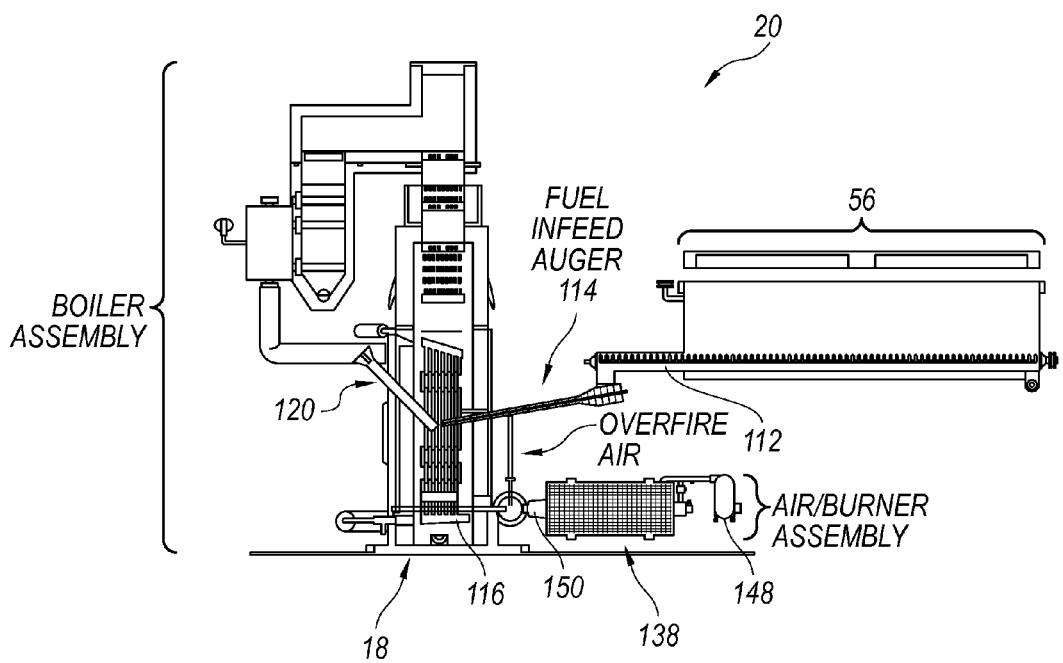
FIG. 19 is a schematic side elevation view of dry fuel bin assembly of FIG. 18 attached to a fluidized bed combustor in the system of FIG. 1.

As seen in FIGS. 18 and 19, the hopper 56 of the illustrated embodiment includes a dry fuel conveyor 112 coupled to the bottom of the hopper's bin. The conveyor 112 is connected to a fuel in-feed auger assembly 114 that carries the dried solid fuel material to the firebox or fluidized bed 116 of the combustor 18 (FIG. 19), wherein the dried solid fuel material is burned in a suspension of sand particles. In the illustrated embodiment, the in-feed auger 114 feeds the dried solid fuel material into the fluidized bed combustor 18 approximately 12 cm (4.5 in.) above the fluidized bed 116 and at approximately the same height as a flow of combustion air received from a combustion fan, discussed in greater detail below. While the illustrated embodiment utilizes a dry fuel feed auger assembly 114, other fuel delivery systems need be used, including a gravity fed system, or other pain systems to provide the solid fuel material into the combustor.

In one embodiment, the waste processing system 10 (FIG. 1) can include an auxiliary dry fuel hopper 118 (FIG. 1) containing auxiliary fuel, such as coal, wood pellets, organic garbage, or other suitable dry fuel that can be burned in the fluidized bed combustor 18 along with the dried solid fuel material if needed. The auxiliary dry fuel hopper 118 also includes an in-feed auger 120 (FIG. 19) connected to the combustor 18 for delivery of the auxiliary fuel to the fluidized bed 116 for combustion. The in-feed auger 120 can also be used to add sand, limestone, or other selected bed material to the fluidized bed 116 of the combustor 18.

Combustor Assembly

Figure 20:
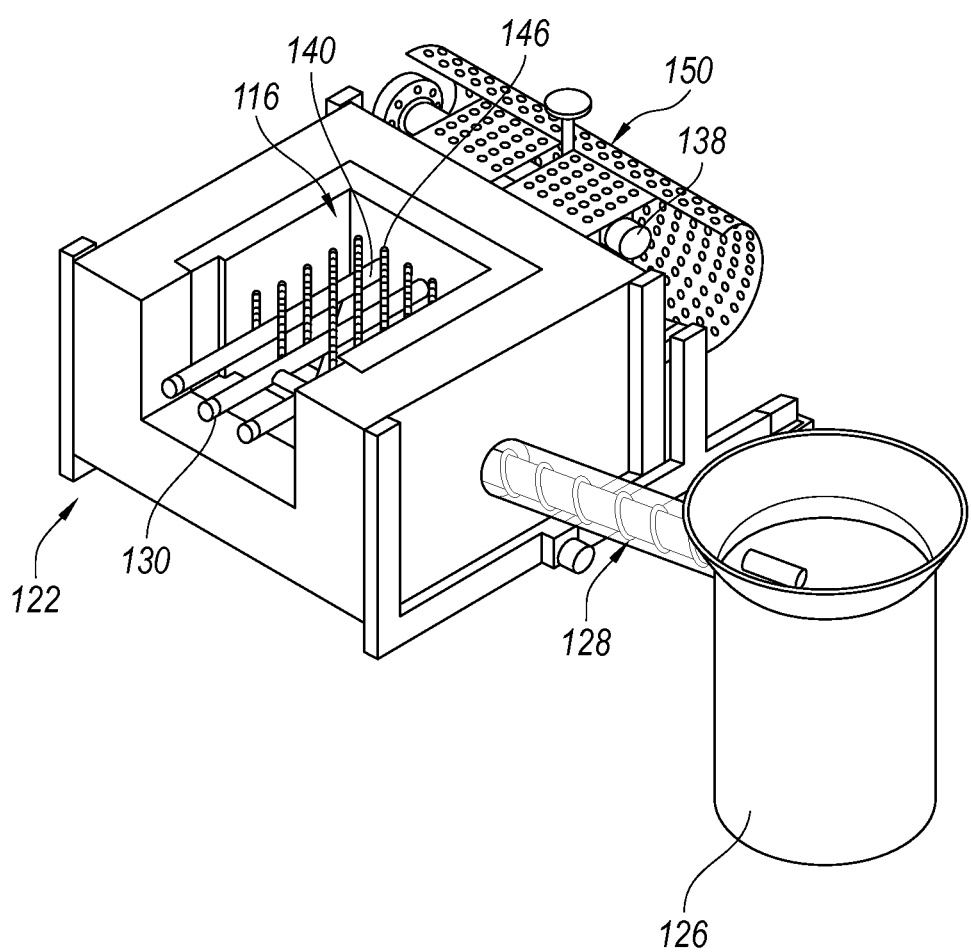
FIG. 20 is a partial cut away isometric view of a firebox and discharge bin of the fluidized bed combustor of FIG. 19.
Figure 22:
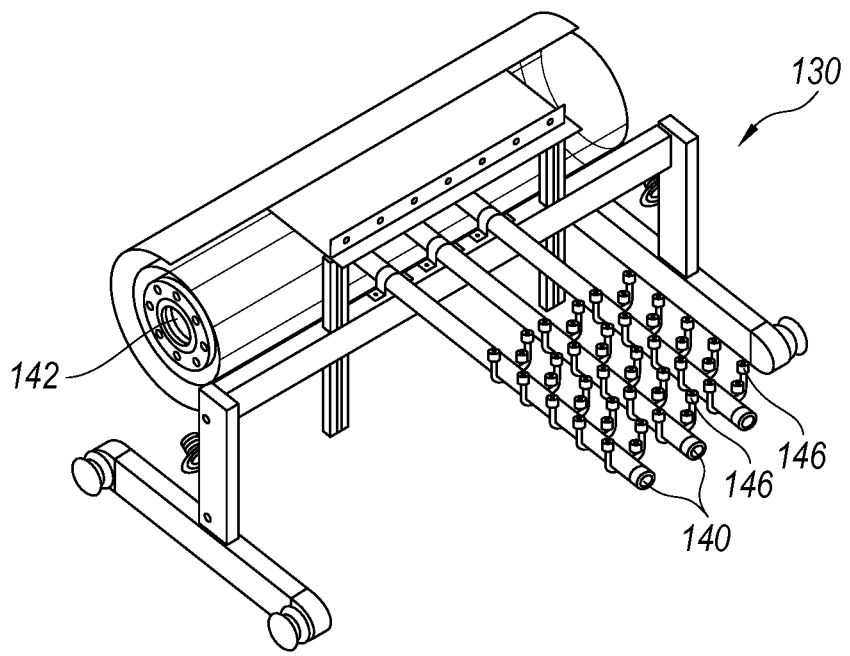
FIG. 22 is an enlarged isometric view of an air distribution grate shown removed from the firebox of FIG. 20.

As shown in FIG. 19, the fluidized bed combustor 18 is connected to the lower portion of the boiler 20 so as to burn the dried solid fuel material and heat the boiler 20. The combustor 18 of the illustrated embodiment has a firebox 122 that houses the fluidized bed 116 and associated heat transfer equipment. FIG. 20 is a partial cut away isometric view of the firebox 122, which is connected to an ash discharge bin 126 by a discharge auger 128. FIG. 22 is an enlarged isometric view of the air distribution grate 130 shown removed from the firebox 122. The illustrated air distribution grate 130 is configured to fluidize the bed 116 in a homogeneous and stable manner, and it supplies the primary combustion air for the burning process within the combustor assembly 18. The illustrated fluidized bed 116 comprises sand, although limestone or other suitable materials, or mixtures thereof may be used. The air distribution grate 130 is configured to operate for long time periods without warping, braking, or plugging. The air distribution grate 130 is also integrated into the firebox 122 in a manner allowing it to be easily and quickly replaced or repaired to minimize any down time of the combustor 18 and the associated system 10.

The air distribution grate 130 includes an insulated air distribution pipe 140 with an air inlet 142 and a plurality of sparger-type air manifold tubes 144 connected to the air distribution pipe 140 downstream of the air inlet 142. The manifold tubes 144 are parallel and spaced fairly close to each other to allow ash and small sand particles to easily fall between the manifold tubes 144 for removal by the discharge auger 128 to the discharge bin 126 (FIG. 20). The spaced apart manifold tubes 144, however, prevent clinkers and large unburned material from dropping into the discharge auger inlet. Each manifold tube 144 is connected to a plurality of bubble cap air nozzles 146 distributed in a grid format. The bubble cap air nozzles 146 provide smooth and even air distribution into the freeboard portion above the bed 116 for homogeneous fluidization in the firebox.

Figure 21:
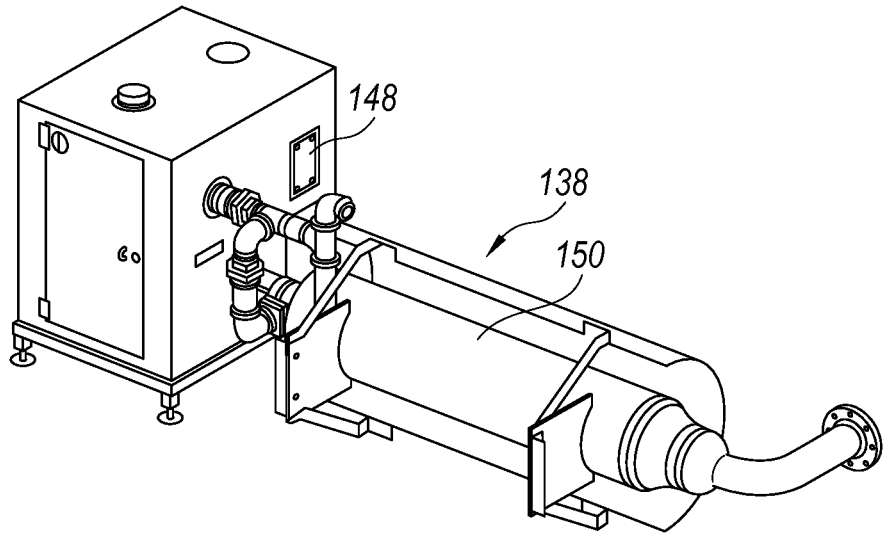
FIG. 21 is an enlarged isometric view of a combustion air compressor and in-line burner assembly shown removed from the firebox of FIG. 20.

In the illustrated embodiment shown in FIG. 21, the air distribution grate 130 is connected to an in-line burner assembly 138 that can be activated to preheat incoming combustion/fluidization air as needed, such as during initial startup and warm up of the fluidized bed 116 (FIG. 20). The in-line burner assembly 138 includes a shrouded heater 150 that receives a flow of air from a combustion fan 148. The heater 150 is connected to the air inlet 142 of the air distribution pipe 140 (FIG. 22) to provide the combustion air to the fluidized bed 116 via the air distribution grate 130 (FIG. 20). The combustion fan 148 of the illustrated embodiment provides air at an approximate flow rate of up to 750 $ft^3$/min compressed to approximately 50 in. $H_2O$. The heater 150 can run on natural gas, propane, butane, or other suitable fuel to preheat the combustion air when needed. Once the combustor 18 has warmed up close to operational temperature, the in-line burner assembly 138 is no longer needed, and the combustion fan 148 provides the unheated air to the fluidized bed 116 for combustion with the solid fuel material.

Boiler

The combustor assembly 18 is positioned within the boiler 20, and the heat generated upon burning the dried solid fuel material provides a continuous flow of heated exhaust gas that flows through the boiler 20 along an exhaust gas path 158 (FIG. 23) and boils a continuous flow of primary liquid water flowing generally in the opposite direction through the boiler 20 along a primary water path 160 (FIG. 24) to produce high pressure steam that will power the steam engine 26 (FIG. 1). The boiler 20 and its components will be discussed in connection with the exhaust gas path 158 (FIG. 23) and then in connection with the primary water path 160

Figure 23:
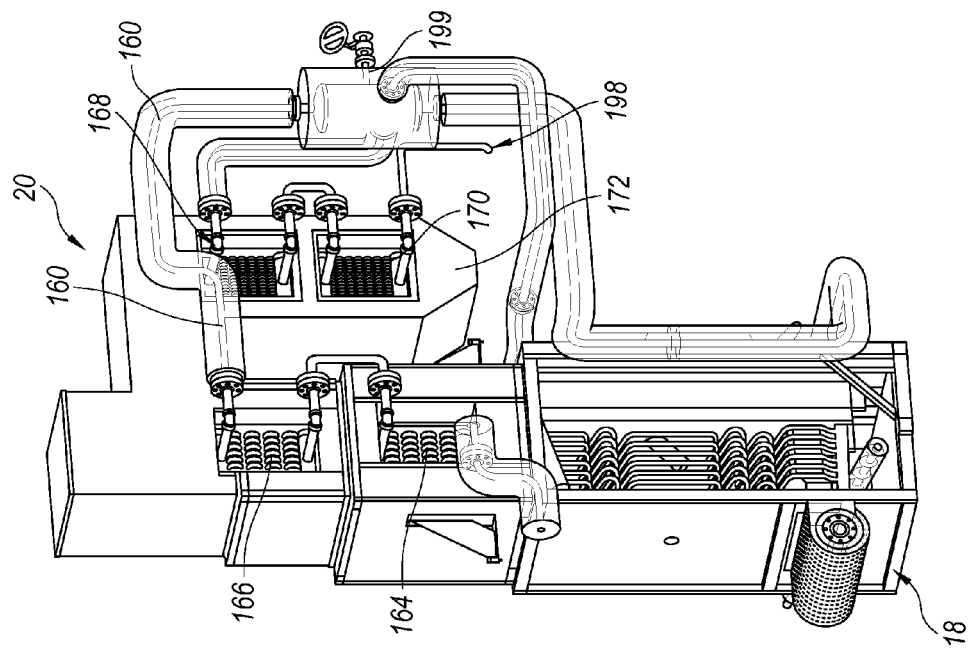
FIG. 23 is an enlarged, partially cut away, isometric view of a dry fuel combustor and boiler of the system of FIG. 1 showing the heated exhaust gas path through the boiler.

FIG. 23 is an enlarged, partially cut away, isometric view of the dry fuel combustor 18 and the boiler 20 showing the heated exhaust gas path 158 through the boiler. A lower portion of the boiler 20 includes an evaporator 162 embedded at least partially in and positioned immediately above the fluidized bed 116. Accordingly, the high-temperature heat generated from burning the solid fuel material in the fluidized bed 116 flows around and efficiently heats the evaporator 162. The exhaust gas path 158 flows upwardly from the evaporator 162, over a primary superheater 164 connected to the evaporator 162, and then over a secondary superheater 166 connected to the primary superheater 164. The exhaust gas path 158 flows from the secondary superheater 166 over a primary economizer 168 and then over a secondary economizer 170. The heated exhaust flowing along the exhaust gas path 158 cools as it transfers heat sequentially to each of the evaporator 162, the primary superheater 164, the secondary superheater 166, the primary economizer 168, and the secondary economizer 170. The secondary economizer 170 is contained in an economizer housing 172 and connected to an exhaust outlet 174. By the time the exhaust gas reaches and flows over the secondary economizer 170, the exhaust gas transfers only low grade heat to the secondary economizer 170 before exiting the exhaust outlet 174.

Figure 24:
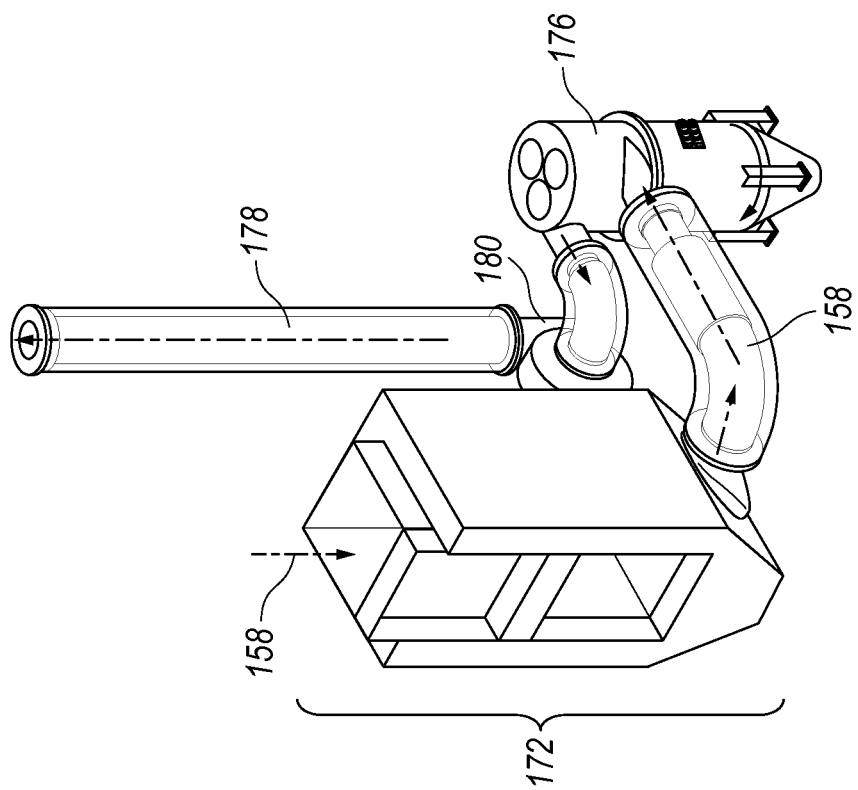
FIG. 24 is an enlarged partial isometric view of an economizer housing and multi-clone assembly shown removed from the dry fuel combustor of FIG. 23.

FIG. 24 is an enlarged partial isometric view of the economizer housing 172 and a multi-clone assembly 176 connected to the exhaust outlet 174. The exhaust gas enters the multi-clone assembly 176 and flows through one or more conventional cyclones to remove any remaining ash or particulates from the exhaust flow, thereby providing clean exhaust gas that exits the multi-clone assembly 176. The exhaust gas can also be bubbled through a chemically treated water column to remove any additional contaminates before being released to the atmosphere. The substantially particulate free exhaust gas exits the multi-clone assembly 176 and flows through an exhaust stack 178 open to the atmosphere. In the illustrated embodiment, an induced draft fan 180 is positioned between the multi-clone assembly 176 and the exhaust stack 178 and is configured to facilitate flow of the exhaust gas along the entire exhaust gas path 158 and out the exhaust stack 178. In the illustrated embodiment, the fan 180 is capable of pulling approximately 8 inches of $H_2O$ vacuum at a flow rate of approximately 775 scfm, although other embodiments can use other fans or exhaust draw systems for controlling the flow and rate of exhaust gas along the exhaust gas path 158.

Figure 25:
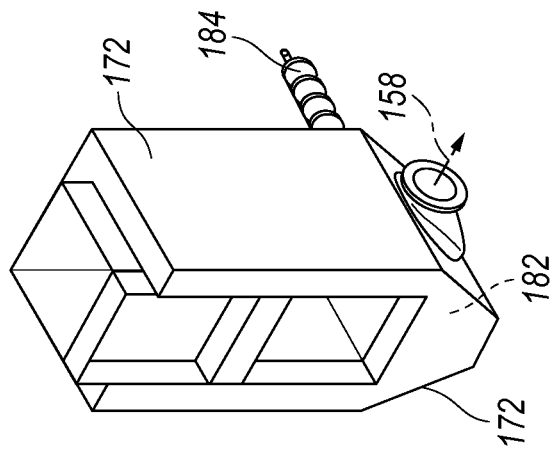
FIG. 25 is an enlarged partial isometric view of the economizer housing and an ash auger shown removed from the dry fuel combustor assembly of FIG. 23.

FIG. 25 is an enlarged partial isometric view of the economizer housing 172, which has an ash collection area 182 in the bottom of the housing and an ash auger 184 connected to the ash collection area 182. By the time the exhaust gas enters the economizer housing 172, the exhaust gas has substantially cooled, and any heavier ash particles that may be flowing with the exhaust gas will drop into and collect in the ash collection area 182. The ash auger 184 is configured to carry the collected ash away from the economizer housing 172 and into a collection bin or other collection system (not shown).

Primary Water Circuit Prior to Boiler

Turning now to the primary water path 160, the flow of primary water enters the boiler 20 in the liquid phase. As discussed above in connection with the sludge dryer assembly 14, the primary water flow from the steam engine 26 is condensed in the sludge dryer assembly to the liquid phase. In the illustrated embodiment shown in FIG. 1, the flow of primary liquid water from the sludge dryer assembly 14 can pass through a radiator 190 to help cool the primary liquid water prior to continuing along the primary water circuit 21.

As the primary water (sometimes referred to as "feedwater") moves through the primary water circuit 21 in the steam/vapor and liquid phases, some of the primary water may be lost. For example, some primary water may be lost by steam blowing by in the steam engine 26 wherein steam blows past the piston along the cylinder walls in the engine. In addition, some of the primary water may be removed from the system 10 and discarded at the lowest point in the system 10 to remove any used chemicals or minerals that may have precipitated out of the primary water, which is referred to as blowdown. Depending upon the water quality and the system 10, blowdown can constitute up to approximately 5% of the total flow of the primary water. Accordingly, makeup water can be added to the primary water circuit 21 via a water conditioner 192 located downstream from the radiator 190.

The water conditioner 192 can also add chemicals or additives to the primary water while in liquid phase. In some embodiments, the chemicals and/or additives are added to the makeup water introduced into the primary water circuit 21. For example, the makeup water may be softened via chemical additives prior to entering the primary water circuit to reduce scaling of the pipes in the boiler 20. Chemical additives may also be used to minimize impurities and corrosion products, which can negatively impact heating efficiencies or can potentially shorten the operational life of the conduits through which the primary water flows in the primary water circuit 21. In addition, the water conditioner 192 can be used to treat incoming water, which may be hard public water, prior to the makeup water being added into the primary water circuit 21.

The primary water flows from the water conditioner 192 and is collected in a feedwater tank 194 before the primary liquid water is introduced into the boiler 20. The feedwater tank 194 can include a level switch so that after the primary liquid water is returned, the system has a way of measuring and adding the appropriate quantity of makeup water and chemicals to account for any losses in the primary water circuit 21. The primary liquid water is drawn from the feedwater tank 194 by a feedwater pump 196 that pumps the primary liquid water into the boiler 20.

Primary Water Path in Boiler

Figure 26:
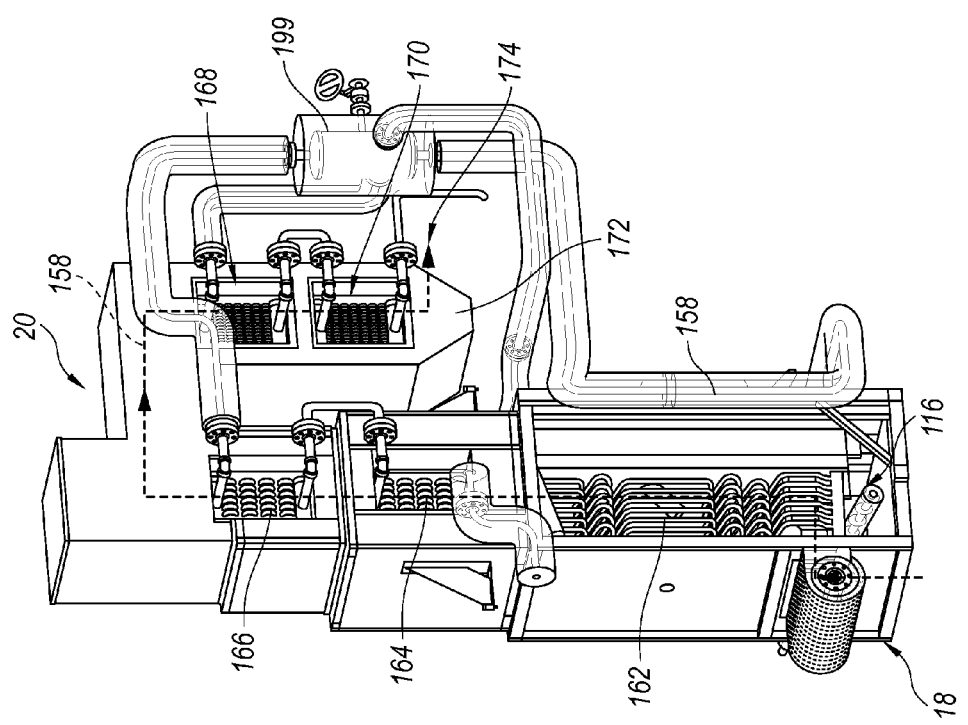
FIG. 26 is an enlarged, partially cut away, isometric view of the dry fuel combustor and boiler assembly of FIG. 23 showing the primary water path through the boiler.

Returning now to the boiler 20, FIG. 26 is an enlarged, partially cut away, isometric view showing the primary water path 160 through the boiler 20. The primary liquid water received from the feedwater pump 196 (FIG. 1) is introduced as cold pressurized water into the boiler 20 through a water inlet 198 adjacent to the secondary economizer 170. The cold primary water from the pump 196 is pressurized to approximately 4130 kPa (600 psia), and it flows through the secondary economizer 170, which is heated by the exhaust gas at the coolest portion of the exhaust gas path 158 (FIG. 23) within the boiler 20. In the illustrated embodiment, the secondary economizer 170 heats the primary liquid water to its saturation point, which is approximately 525K at 4.135 MPa.

The primary water flows from the secondary economizer 170 through the primary economizer 168, wherein the primary water is heated to its boiling point. The primary water flows out of the primary economizer 168 as steam and into a steam drum 199, wherein the dry, saturated steam is separated from any saturated liquid. Any saturated liquid in the steam drum 199 is returned and reintroduced into the evaporator 162. The dry primary steam flows out of the steam drum 199 and sequentially through the secondary and primary superheaters 166 and 164. The primary steam exits the primary superheater 164 as high-temperature, superheated steam, which flows out of the boiler 20, along the downstream portion of the primary water path 160 to the steam engine 26.

Figure 27:
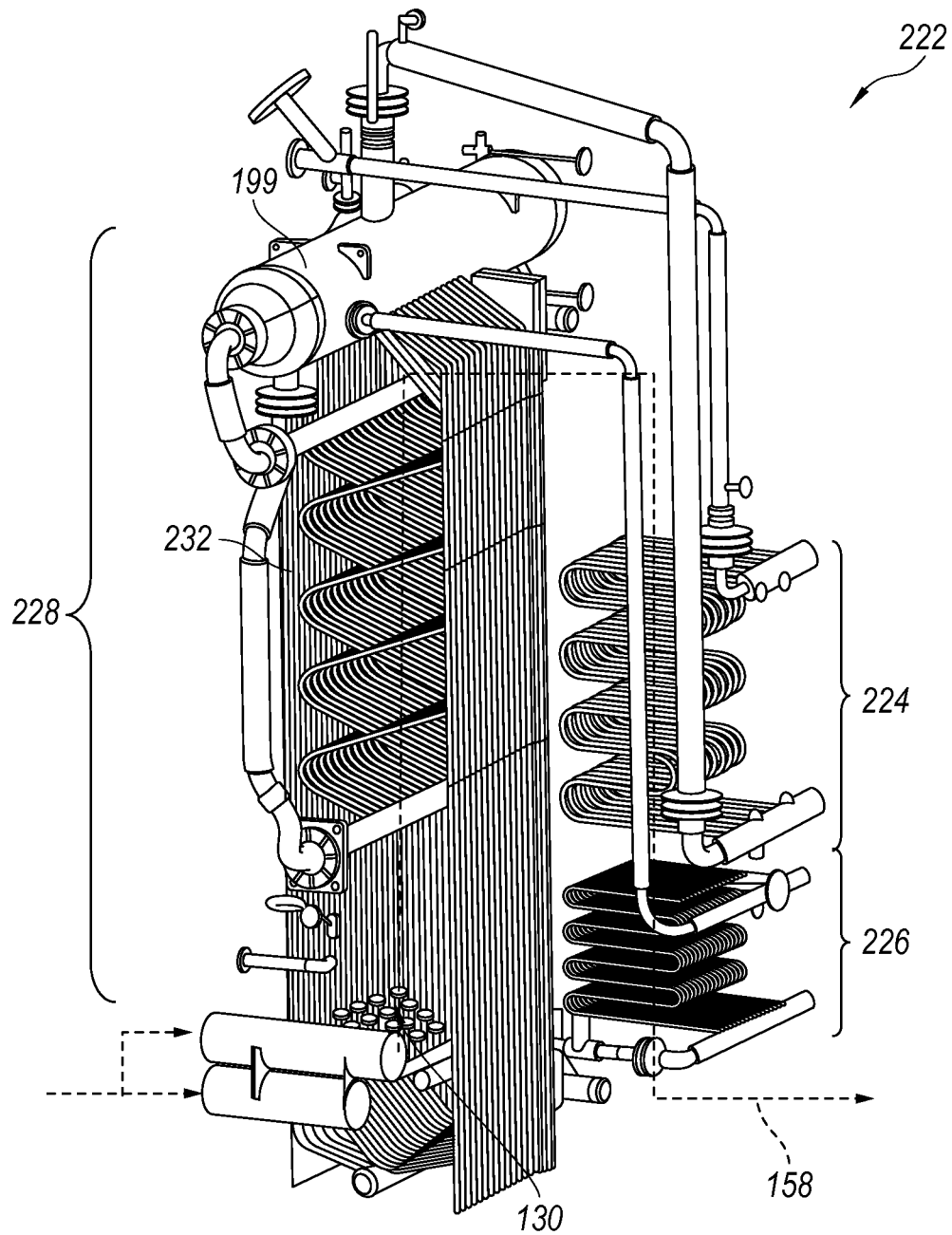
FIG. 27 is a partially cut away isometric view of the piping components of a boiler of an alternate embodiment.

Although the boiler 20 illustrated in FIGS. 23 and 26 includes two superheaters 164/166 and two economizers 168/170, the boiler 20 of other embodiments may include only one superheater and/or only one economizer. For example, FIG. 27 is a partially cut away isometric view of the piping components of a boiler assembly 222 of an alternate embodiment that includes only one superheater 224 and one economizer 226 coupled to the evaporator 228 and the steam drum 199. In this alternate embodiment, the steam drum 199 is connected to a plurality of vertical pipes that form waterwalls 232 on opposing sides of the evaporator 228, which helps to shield the evaporator, the fluidized bed 116, and the firebox 122, to retain heat between the waterwalls, and to help heat the saturated water flowing through the waterwalls 232. Accordingly, use of the waterwalls 232 helps to eliminate or decrease the amount of refractory material needed within the boiler.

Figure 29:
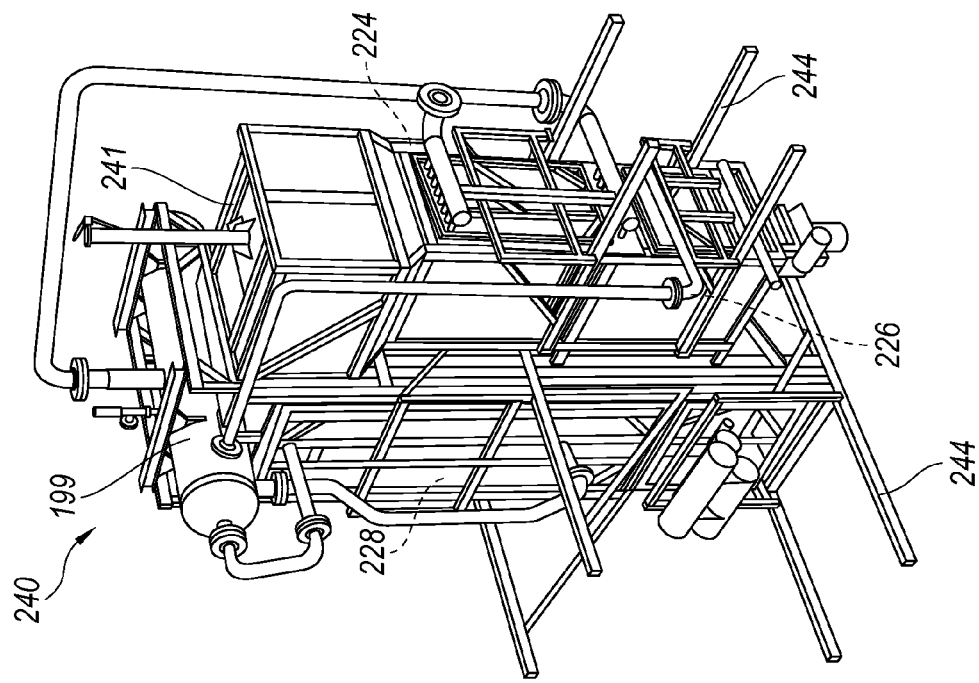
FIG. 29 is an isometric view of the fluidized bed combustor and boiler of FIG. 28, wherein the modular boiler components are shown in stowed, operational positions.
Figure 28:
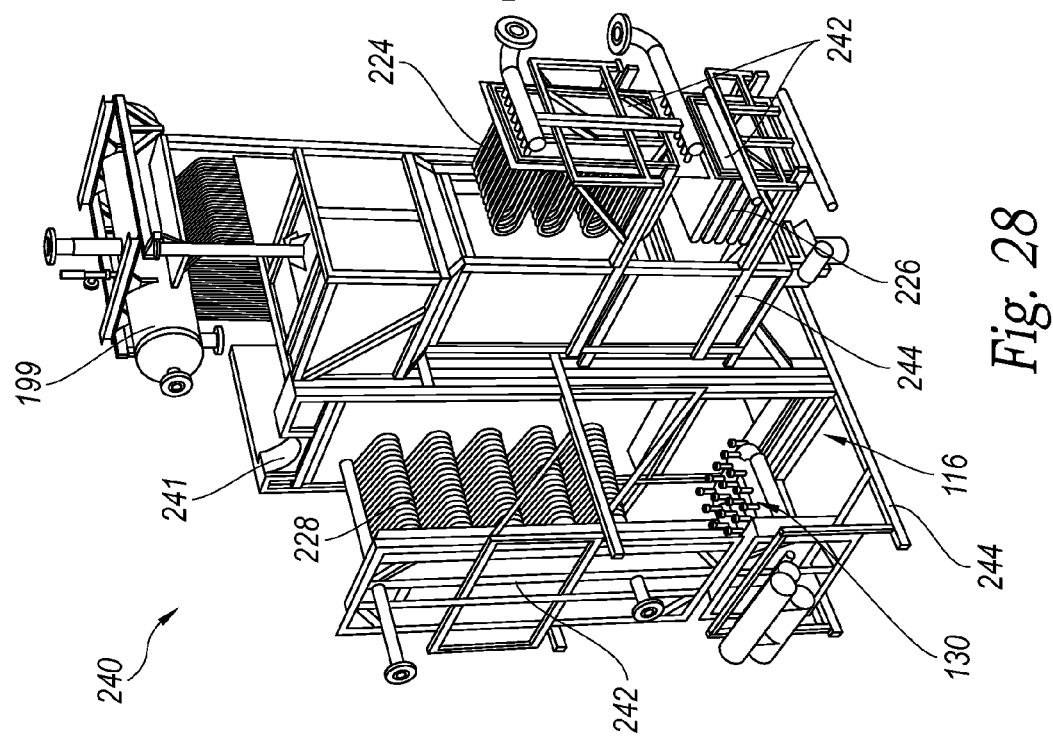
FIG. 28 is an isometric view of a fluidized bed combustor and boiler in accordance with another embodiment, wherein modular boiler components are shown in open, exposed positions.

FIGS. 28 and 29 are isometric views of a boiler 240 in accordance with another embodiment. The boiler 240 has a component layout similar to FIG. 27, wherein one superheater 224 and one economizer 226 are positioned alongside the evaporator 228, which allows for significantly more freeboard within the evaporator section above the fluidized bed 116. This embodiment also includes the waterwalls 232 extending from the steam drum 199. In addition, the boiler 240 has a housing 241, and the superheater 224, the economizer 226, and the evaporator 228 are each mounted on frame structures 242 movably carried on one or more rails or sliders 244 connected to the housing 241.

Each frame structure 242 and its respective boiler components (i.e., superheater 224, economizer 226, and/or evaporator 228) is movable as a unit relative to the housing 241 in a translatable manner analogous to a drawer motion between an open, exposed position (FIG. 28) and a closed, operational position (FIG. 29). Any or all of the superheater 224, the economizer 226, and/or the evaporator 228 can be moved to the open, exposed position in a modular manner, such as for maintenance or replacement when the system 10 (FIG. 1) is not running. Before the boiler components can be moved to the open, exposed position, some of the interconnecting piping defining the primary water path 160 may need to be disconnected. The superheater 224, the economizer 226, and/or the evaporator 228 can be slid back into the housing 241 and to the closed operational position, and the interconnecting piping reconnected. This modular approach can greatly decrease potential down time of the system 10 as well as the cost for conducting regular maintenance of the boiler 240.

In another embodiment, the boiler 20 can be a concentric boiler having a central combustion chamber and fluidized bed. A generally cylindrical evaporator is coaxially arranged with the combustion chamber, and the superheater and the economizer are concentrically disposed radially outward of the evaporator. Other embodiments can utilize boilers with other configurations and/or components and/or component arrangements.

Power Plant

Figure 30:
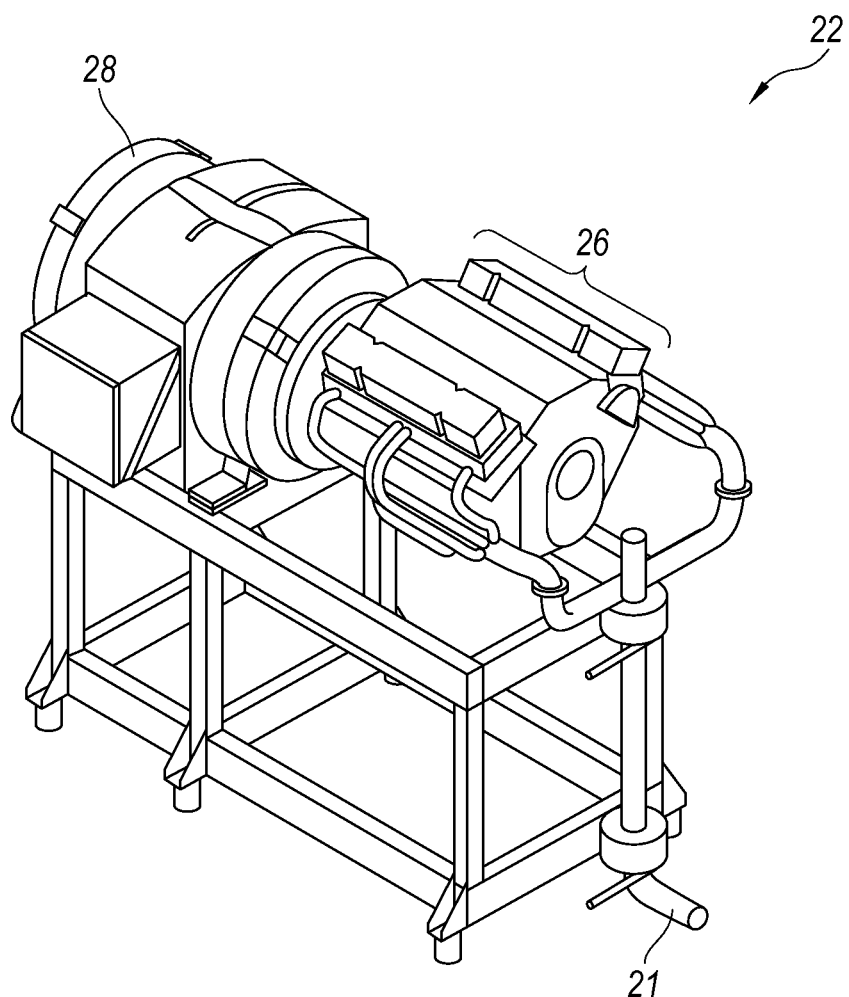
FIG. 30 is an isometric view of a power plant assembly with a steam engine and generator shown removed from the system of FIG. 1.

FIG. 30 is an isometric view of the power plant assembly 22 with a generator 28 driven by the steam engine 26. In the illustrated embodiment, the generator 28 is a 175 kW induction generator with an operational output of up to approximately 150 kW (200 hp). The electricity produced from the generator 28 is utilized to power any parasitic loads, including the air blower, all of the pumps, the motors that turn the augers, etc. The excess electricity can be made available for local use or provided to a selected power grid.

The steam engine 26 driving the generator 28 receives the superheated primary steam from the boiler 20 (FIG. 1), and the primary steam is expanded in the engine to approximately 207 kPa (~30 psia). The steam engine is a multicylinder reciprocating piston engine with a head assembly 300 configured to use the hot steam at a temperature of up to approximately 480° C. (900° F.) and to operate for long durations at high pressures, such as approximately 4130 KPa (600 psia). In the illustrated embodiment, the engine 26 is a six-cylinder engine, although other engines, such as a V-8 reciprocating piston engine, may be used.

Figure 31:
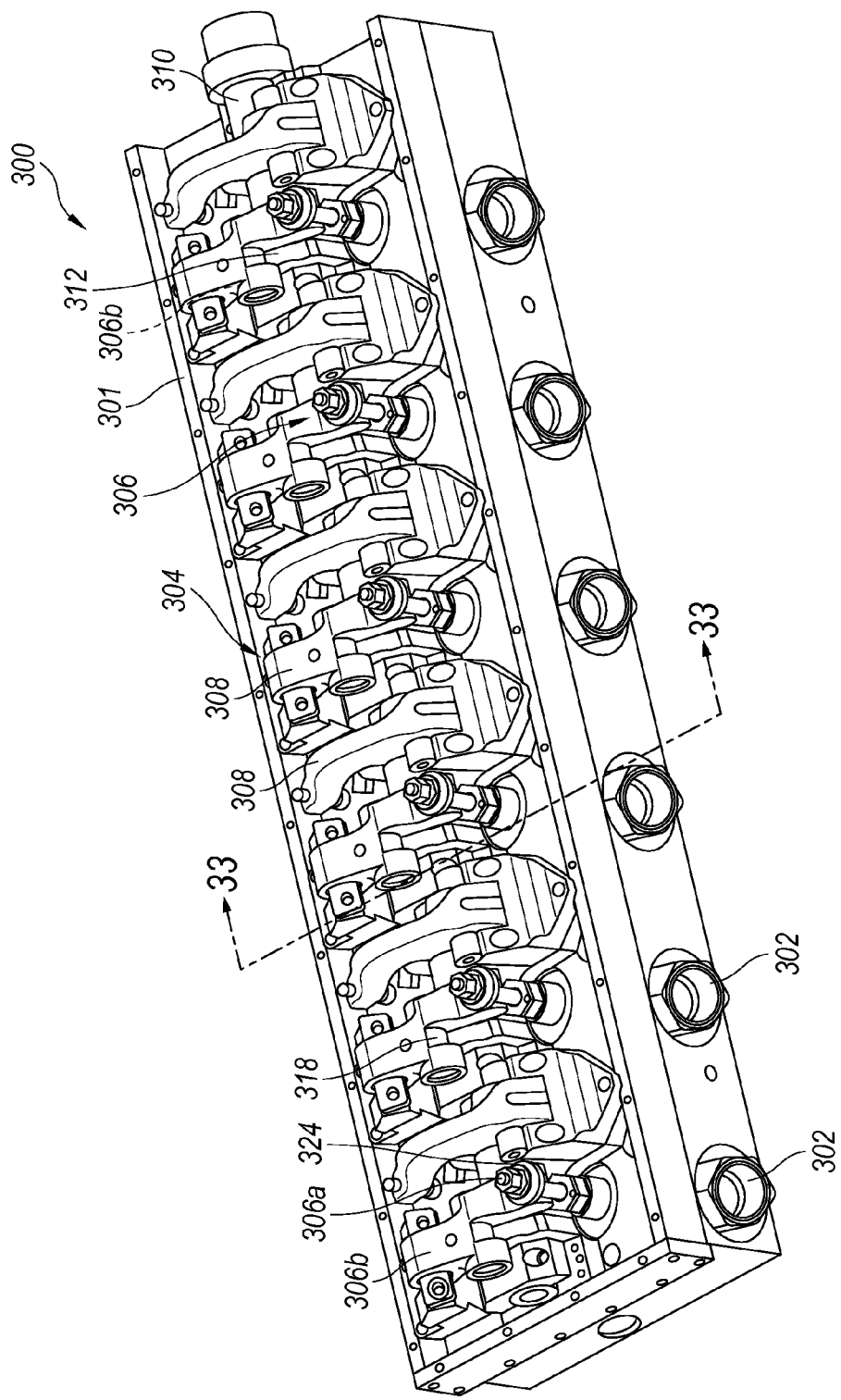
FIG. 31 is a partially cut away, enlarged top isometric view of the engine's head assembly with a camshaft, cams, rocker arms, and valve train in accordance with an embodiment of the technology.

FIG. 31 is a partially cut away enlarged top isometric view of the engine's head 301 removed from the block. The illustrated head assembly 300 includes a head 301 made of steel and that includes a steam inlet port 302 for each cylinder. The steam inlet ports are positioned generally on top of the cylinder head. The head assembly 300 includes a valve train 304 with poppet valves 306 and associated rocker arms 308 for each cylinder. A camshaft 310 has a plurality of precisely contoured cams 312 for each of the intake and exhaust poppet valves 306a and 306b. Rotation of the camshaft 310 and the associated cams 312 controls the opening and closing of the intake and exhaust valves 306a and 306b for the specific operating parameters of the steam engine 26.

The reciprocating steam cycle of the steam engine 26 consists of four distinct events taking place over two strokes of the engine's piston within its cylinder. Starting at Top Dead Center (TDC), the cylinder's intake valve 306a opens and the superheated, high-pressure steam (received from the boiler) flows through the steam inlet port 302 and into the cylinder while the piston moves downwardly toward Bottom Dead Center (BDC). At a specified cut-off volume of steam, the intake valve 306a closes and the piston completes the power stroke to BDC. At BDC the exhaust valve 306b opens, and the exhaust stroke begins as the piston moves upwardly toward TDC. At a specified time before TDC, the exhaust valve 306b closes so the cylinder pressure rises close to the boiler pressure. This minimizes the throttling losses when the intake valve 306a opens.

As the steam engine 26 of the illustrated embodiment is operating with steam based on a boiler pressure of approximately 4130 kPa (600 psia), the intake and exhaust valves 306a and 306b must be carefully controlled via precise cam profiles and valve train arrangement to maximize the engine's efficiency and power for the given boiler pressure and the engine torque limits. In the illustrated embodiment, at a boiler pressure of approximately 4130 kPa (600 psia), the cut off ratio for each cylinder (i.e., the ratio of the cutoff volume to the total volume of the cylinder) is approximately 11%. Accordingly, the intake valve 306a must be opened just long enough to fill 11% of the cylinder with the high-pressure primary steam. The steam engine 26 (FIG. 30) is configured to provide a clearance volume of approximately 17.7 cc rather than a typical, conventional clearance volume of approximately 70 cc for an engine with a compression ratio of approximately 9.8. This clearance volume of 17.7 cc provides 28° of crankshaft rotation to achieve the desired cut off ratio of 11%. Because the camshaft 310 rotates twice as fast as the crank shaft, the camshaft 310 and cams 312 must open and close each intake valve 306a within 14° of revolution. This quick motion is controlled by the cam profiles and the intake valve 306a configuration.

Figure 32:
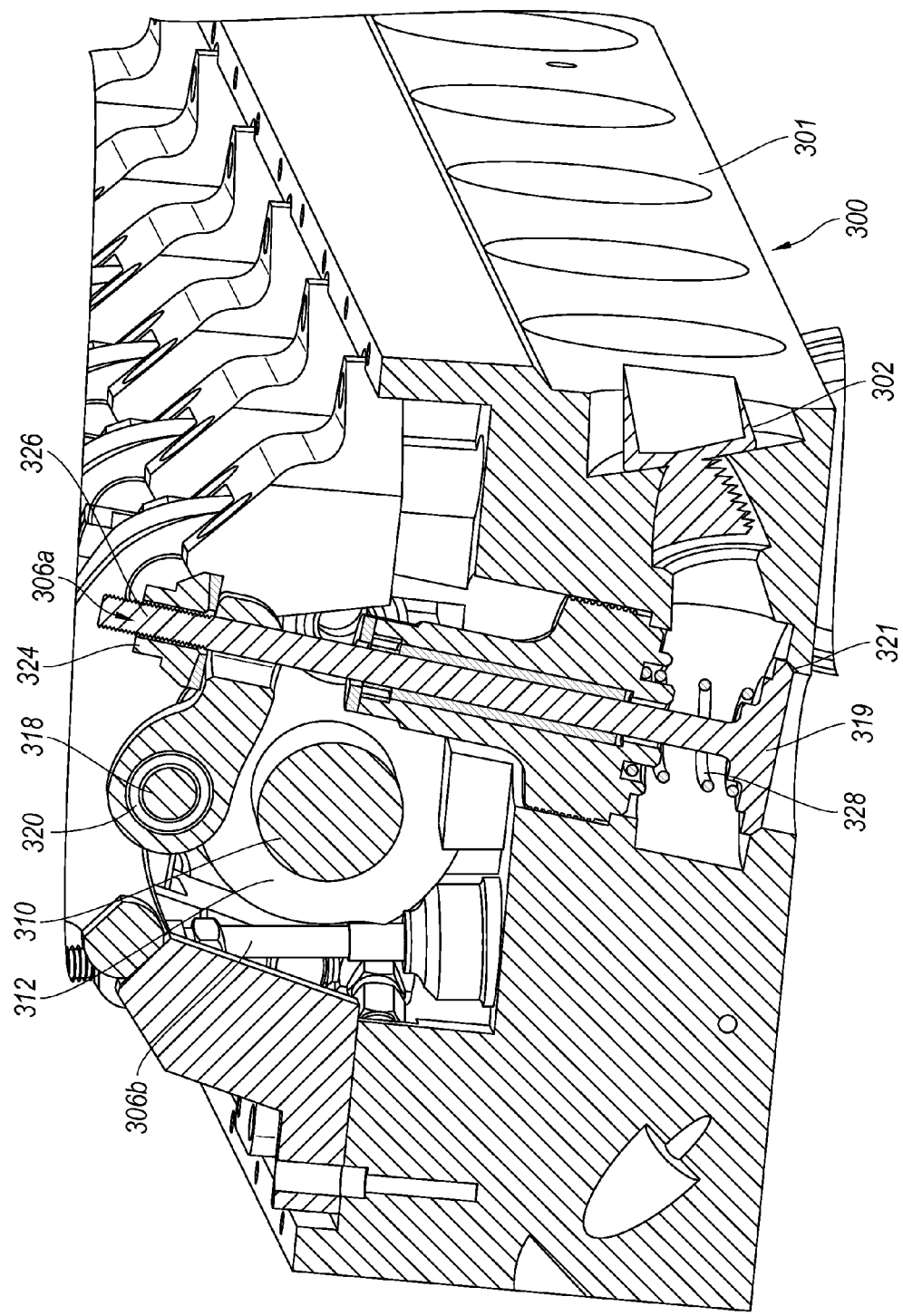
FIG. 32 is an enlarged partial cross-sectional, isometric view of the steam engine's head assembly of FIG. 31 with an intake cam, intake and exhaust valves, and associated rocker arms.

FIGS. 31 and 32 are enlarged cross-sectional views of the head assembly 300 showing an intake cam 312a, the intake valve 306a, and associated rocker arm 308a. Given that the cutoff ratio for the engine of the illustrated embodiment is only 11%, the cam profile for each intake cam 312a includes extremely small lobes 314 configured to quickly and precisely pivot the respective rocker arm 308a to open and close the associated intake valve 306a. This small lobe shape must have fairly steep transition areas 316 on the cam profile, which creates a substantially concave, small-radius curve that the cam follower 318 must follow. In the illustrated embodiment, the cam follower 318 is a rolling cam follower rotatably carried by a pair of bearings 320 within the rocker arm 308a above the respective intake cam 312a. This arrangement of the rolling cam follower 318 and bearings 320 in the rocker arm 308a allows the cam follower 318 to handle the inertial loads during operation of the engine 26.

Figure 33:
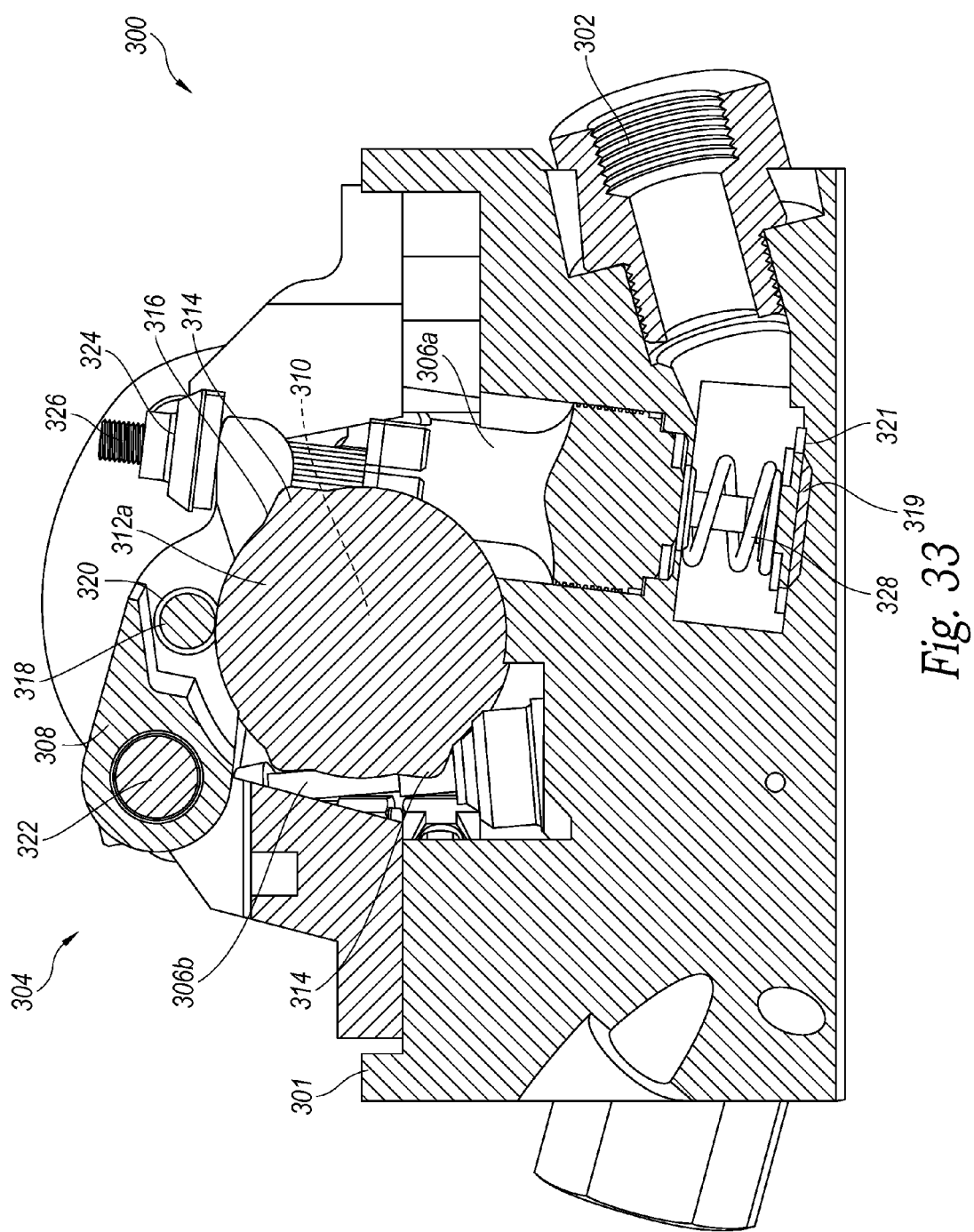
FIG. 33 is an enlarged cross-sectional of the steam engine's head assembly taken substantially along line 33-33 of FIG. 31.

As shown in FIG. 33, when the intake valve 306a is closed, its valve head 319 sealably sets on top of a valve seat 321 in the head 301, and the steam inlet port 302 to delivers the primary steam above the intake valve 306a (i.e., on top of the valve head). The valve train 304 is configured with the cam follower 318 positioned vertically above its respective cam 312, and the cam follower 318 is spaced apart from the rocker arm's pivot pin 322. Also, the distal end of the rocker arm 308 is positioned under and engages the bottom surface of a collar 324 threadably attached to the top of the intake valve's shaft 326. When the intake cam 312a rotates and the cam follower 318 engages the small lobe 314, the rocker arm 308 pivots upwardly about the pivot pin 322 and pulls the intake valve 306a upwardly to lift the valve head 319 away from the valve seat 321, thereby briefly opening the intake valve 306a. Accordingly, the intake valve 306a is a pull poppet valve. As the cam's lobe 314 passes the cam follower 318, the intake valve 306a is quickly closed. Unlike intake valve 306a, the exhaust valve 306b does not require such quick, responsive action and can be a push poppet valve.

The illustrated cylinder head configuration is such that the hot, high-pressure steam is on top of the cylinder head, and the inlet valve 306a needs to be on the same side as the high-pressure steam, otherwise the inlet valve 306a would open by the steam pressure. As the inlet valve's position is on the top of the head below the steam inlet port 402, the high-pressure steam holds the intake valve 306a closed. In the illustrated embodiment, the intake valve 306a is connected to a spring 328 that provides additional forces to help lift and open the intake valve to let steam into the cylinder as the piston moves from TDC until the achieving the cutoff volume (~11%).

The configuration of the steam engine 26 of the illustrated embodiment also provides improved temperature control of the engine during operation, particularly at high RPMs (i.e., ~1850) over very long time periods. Unlike conventional steam engines that use double acting cylinders with steam pressure applied alternately to either side of the piston and exhausted on either side of the piston, the steam engine 26 of the illustrated embodiment has single acting cylinders. To avoid steam leaking around the piston particularly at low operating temperatures (i.e., during start up), the current engine 26 utilizes liquid coolant built into the engine with both a radiator and heater to control the temperature of the engine. When the engine 26 is starting and not yet warmed up, the heater keeps the engine's cylinders well above water's boiling temperature, so the steam will not condense. Because the high-pressure steam is hot, once the engine is running, the temperature control system is in a cooling mode. Accordingly, the temperature control system carefully controls the engine temperature and prevents the engine 26 from getting too hot, which would damage the oil, and from getting too cold (i.e., below approximately 160° F.), wherein the oil in the crank case and any water that gets past the piston via blow-by would mix and form an emulsion that would be impossible to separate.

Controls

The fecal sludge waste processing system 10 of the illustrated embodiment also includes a plurality of automated, integrated, computerized controls interconnected and configured for control of the entire system 10 with only minimal supervision from an operator, during normal operation. Control and monitoring of the equipment and processes are accomplished primarily through a central programmable logic controller (PLC) that collects inputs from sensors and sets output levels for the control devices, such as the valves and motors. The PLC is also configured to control operation of specialty controls for the electric generator system and propane burner used during startup. The PLC is also configured to divide the overall system into manageable subsystems, such as clean water/steam, combustion, fuel handling, and power generation. Control inputs are provided to decouple subsystems from each other to the extent desired. The subsystems can be further divided into control loops to provide set points for individual outputs.

The clean water/steam subsystem is configured to provide steam at a constant temperature and pressure to power plant 22, and to provide heat (in the form of steam) to the sludge dryer assembly 14 for generating sufficiently dry solid fuel. Control loops are used to regulate the quantity of makeup water entering the system, the condensate quantity entering the evaporator, the quantity of steam bypassing the steam engine, and the heat applied to the sludge drying assembly. The clean water/steam system is also configured to monitor and treat any external water entering the system, such as city water, and to control the total dissolved solids content of the boiler water through a blowdown system.

The combustion subsystem is configured to provide sufficient heat to keep the clean water/steam system producing the correct amount and temperature of steam. Control loops are provided that regulate the air flow through the fluidized bed, to operate the propane burner during startup, and to control the air pressure in the combustion chamber. This system will also monitor combustion emissions and exhaust gas handling and maintenance tasks, such as removal and fluidized bed material replacement.

The fuel handling subsystem is configured to provide the correct quantity of dried fuel to the combustion process and handle the waste water generated from the drying process. Control loops are used to provide the correct quantity of wet fuel, to regulate the dwell time of the solid fuel material in the sludge dryer assembly, to meter the dried solid fuel material into the combustor, and to handle the water condensation and treatment process.

The power generation subsystem is configured to provide power to the grid when available. This subsystem has control loops that regulate the electrical power output and regulate the engine speed and torque through modulation of the engine throttle. The control subsystems and low level loops can be integrated into a higher level controller to handle startup and shutdown sequences and to handle emergency and alarm situations appropriately.

From the foregoing, it will be appreciated that specific embodiments of the invention have been described herein for purposes of illustration, but that various modifications may be made without deviating from the invention. Additionally, aspects of the invention described in the context of particular embodiments or examples may be combined or eliminated in other embodiments. Although advantages associated with certain embodiments of the invention have been described in the context of those embodiments, other embodiments may also exhibit such advantages. Additionally, not all embodiments need necessarily exhibit such advantages to fall within the scope of the invention. Accordingly, the invention is not limited except as by the appended claims.

I claim:

1. A multifunctional waste processing system for electricity and water generation, comprising:
  a fuel dryer assembly having a fuel path with a fuel inlet configured to receive a flow of wet organic-based sludge comprising a mixture of water and solid fuel material, the fuel dryer assembly having a heater portion configured to boil the sludge and thermally separate water from the solid fuel material to provide dried fuel, the fuel dryer having a first steam outlet, a dry fuel outlet, and a condenser portion having fluid path with a steam inlet and a fluid outlet, the fluid path being isolated from the fuel path;

a fresh water condenser assembly coupled to the first steam outlet and configured to condense water vaporized from the sludge into clean liquid water;

a dry fuel combustor assembly coupled to the dry fuel outlet of the fuel dryer assembly, the dry fuel combustor assembly having a combustor portion and having a boiler configured to receive heat from the combustor portion, the boiler having a first water inlet and a second steam outlet;

a steam-powered generator coupled to the second steam outlet of the boiler and configured to generate electricity, the steam-powered generator having a third steam outlet coupled to the steam inlet of the condenser portion; and a water pump having a second water inlet coupled to the fluid outlet of the condenser portion of the fuel dryer; and the water pump having a water outlet coupled to the first water inlet of the boiler;

wherein the boiler is configured to convert a flow of water entering the boiler to a flow of steam to power the steam-powered generator.

2. The system of claim 1 wherein the fuel dryer assembly comprises a steam-heated auger in the fuel carrier and configured to move and heat the sludge during the drying process.

3. The system of claim 1 wherein the fuel dryer assembly is a multi-segment dryer having sequential first and second dryer segments each coupled to the condenser portion and each configured to dry the sludge by vaporizing water from the sludge using heat from exhaust steam from the steam-powered generator.

4. The system of claim 3 wherein the first dryer segment generates sludge steam from the sludge, and the second dryer segment uses the sludge steam from the first segment to dry the sludge.

5. The system of claim 3 wherein the first dryer segment generates first dryer steam from water vaporized from the sludge, and the second dryer segment has a first steam carrier portion coupled to the first dryer segment and configured to carry the first dryer steam adjacent to the fecal sludge, and the second dryer segment having a second steam carrier portion isolated from the first steam carrier portion and configured to carry the exhaust steam from the steam-powered generator adjacent to the sludge, wherein heat from the first and second steam carrier portions dries the sludge moving therein.

6. The system of claim 1 wherein the fuel dryer assembly is configured to receive in the condenser portion exhaust steam from the steam-powered generator, the fuel dryer having a first dryer segment connected to the fuel inlet and has a first heater portion coupled to the condenser and configured to vaporize a first portion of the water from the sludge with heat from the exhaust steam, and a second dryer segment connected in series to the first dryer segment and configured to vaporize a second portion of the water from thickened sludge received from the first dryer segment with heat from the exhaust steam.

7. The system of claim 1 wherein the condenser portion of the fuel dryer assembly is configured to receive exhaust steam from the steam powered generator through the first steam inlet, and the fuel dryer assembly having a dryer portion connected to the fuel inlet and adjacent to the condenser portion, the dryer portion is configured to vaporize water from the sludge using the heat from the exhaust steam in the condenser.

8. The system of claim 1 wherein the combustor portion is a fluidized bed combustor assembly.

9. The system of claim 1 wherein the fuel dryer assembly, the fresh water condenser, the dry fuel combustor assembly, the steam powered generator, and the water pump are mounted on a frame and transportable with the frame as a unit.

10. The system of claim 1 wherein the steam-powered generator is a single action, liquid cooled steam engine.

11. A sludge processing system for electricity and clean water generation, comprising:

a sludge dryer assembly having a fuel path with a sludge inlet configured to receive a flow of sludge comprising a mixture of water and solid fuel material, the sludge dryer assembly having a heater portion configured to heat the sludge and thermally separate water from the solid fuel material to provide dried fuel material, the heater portion having a first steam outlet, the sludge dryer assembly having a condenser portion adjacent to the heater portion and having fluid path isolated from the fuel path and having a steam inlet and a fluid outlet;

a fresh water condenser assembly coupled to the first steam outlet and configured to condense water evaporated from the sludge into clean liquid water;

a combustor assembly coupled to the sludge dryer assembly and configured to receive the dried fuel material therefrom, the combustor assembly having a combustor configured to receive and burn the dried fuel material, and having a boiler configured to receive heat from the combustor for creating steam in a fluid path extending between a water inlet and a second steam outlet; and a power plant comprising a steam engine and a generator driven by the steam engine, the steam engine being coupled to the second steam outlet of the boiler to receive steam therefrom, and the generator being configured to generate electricity, the steam powered generator having a third steam outlet coupled to the steam inlet of the condenser portion;

wherein heat from the steam exhausted from the steam engine boils the water in the sludge in the sludge dryer;

wherein the steam exhausted from the steam engine is condensed to a flow of liquid water; and wherein the boiler is configured to receive and convert the flow of liquid water to a flow of steam to power the generator.

12. The system of claim 11 wherein the heater portion of the sludge dryer assembly comprises a sludge carrier portion through which the sludge moves, a steam carrier adjacent to the sludge carrier and positioned adjacent to the sludge for delivery of heat from steam in the steam carrier to the sludge, and a plurality of propulsion members moveably disposed within the fuel carrier and configured to move the sludge in the fuel carrier relative to the steam carrier.

13. The system of claim 11 wherein the fuel dryer assembly is a two-stage dryer having sequential first and second dryer stages each coupled to the condenser portion and each configured to dry the sludge by boiling the water in the sludge to provide dried solid fuel material using heat from exhaust steam from the steam engine.

14. The system of claim 11 wherein the fuel dryer assembly is a two-stage dryer having sequential first and second dryer stages, wherein the first dryer stage generates sludge steam from the sludge, and the second dryer stage uses the sludge steam from the first dryer stage to dry the sludge.

15. The system of claim 11 wherein the fuel dryer assembly is a multi-segment dryer having sequential first and second dryer segments, the first dryer segment generates first dryer steam from water vaporized from the sludge, and the second dryer segment has a first steam carrier portion coupled to the first dryer segment and configured to carry the first dryer steam adjacent to the sludge, and the second dryer segment having a second steam carrier portion isolated from the first steam carrier portion and configured to carry the exhaust steam from the steam engine adjacent to the sludge, wherein heat from the first and second steam carrier portions dries the sludge moving therein.

16. The system of claim 15 wherein the first dryer segment comprises a first fuel carrier, a first steam carrier adjacent to the first fuel carrier, a plurality of propulsion members moveably disposed within the first fuel carrier and configured to move the sludge through the first fuel carrier past the first steam carrier; and the second dryer segment comprises a second fuel carrier, a plurality of steam-heated members within the second fuel carrier and being stationary relative to the second fuel carrier, and a second steam carrier assembly rotatably disposed within the second fuel carrier and configured to move the sludge within the second fuel carrier and past the steam-heated members.

17. The system of claim 11 wherein the condenser portion of the sludge dryer assembly is positioned to receive exhaust steam from the steam engine, the sludge dryer assembly has a first dryer stage with a first heater portion coupled to the condenser portion and configured to vaporize a first portion of the water from the sludge with heat from the exhaust steam, and a second dryer stage connected to the first dryer stage and configured to vaporize a second portion of the water from thickened wet sludge received from the first dryer stage with heat from the exhaust steam.

18. The system of claim 11 wherein the condenser portion is configured to receive exhaust steam from the steam powered generator, and the fuel dryer assembly has a dryer portion adjacent to the condenser portion and configured to vaporize water from the sludge using the heat from the exhaust steam in the condenser.

19. The system of claim 11 wherein the combustor portion is a fluidized bed combustor assembly with a firebox having a combustor bed for dry fuel combustion and an air grate configured to provide combustion air to the combustor bed, and the boiler comprising first heat exchanger connected to the water inlet and configured to heat water flowing therethrough, a steam drum coupled to the first heat exchanger, an evaporator coupled to the steam drum and configured to receive heated, saturated fluid therefrom, the steam drum being configured to receive a flow of steam from the evaporator, and a second heat exchanger coupled to the steam drum and configured to receive dry steam from the steam drum, the second heat exchanger connected to the second steam outlet.

20. The system of claim 11, further comprising:
a sludge containment tank; and
a sludge transporter connected to the sludge containment tank and configured to provide the sludge to the sludge inlet of the sludge dryer assembly.

21. The system of claim 20, wherein the sludge containment tank is a fecal sludge containment tank, and the sludge transporter is configured to provide fecal sludge to the sludge inlet of the sludge dryer assembly.

22. The system of claim 11, further comprising a water filtration system coupled to the freshwater condenser assembly and configured to receive the clean water, the water filtration system having one or more filters that filters the clean water and provides potable water.

23. The system of claim 11, wherein the sludge inlet of the sludge dryer assembly is configured to receive a flow of organic-based sludge.

24. The system of claim 11 wherein the fuel dryer assembly comprises a steam-heated auger in the heater portion, the steam-heated auger being configured to move and heat the sludge during the drying process.

25. The system of claim 11, wherein the sludge dryer assembly comprises a rotatable, hollow auger in the heater portion and configured to receive steam exhausted from the steam engine to heat the auger, wherein the auger is configured to move and heat the sludge during the drying process.

26. The system of claim 1, further comprising a water filtration system coupled to the freshwater condenser assembly and configured to receive the clean water, the water filtration system having one or more filters that filters the clean water and provides potable water.

27. The system of claim 1, wherein the fluid inlet of the fluid dryer assembly is configured to receive a flow of fecal sludge.

28. The system of claim 1, wherein the sludge dryer assembly comprises a rotatable, hollow auger in the heater portion and configured to receive steam exhausted from the steam engine to heat the auger, wherein the auger is configured to move and heat the sludge during the drying process.

* * * * *